US012393208B2

(12) United States Patent
Potter et al.

(10) Patent No.: US 12,393,208 B2
(45) Date of Patent: Aug. 19, 2025

(54) BACKTRACKING METHOD FOR SOLAR TRACKER INSTALLATION

(71) Applicant: OMCO SOLAR, LLC, Phoenix, AZ (US)

(72) Inventors: Sarah Elisabeth Potter, Avondale, AZ (US); Matt Kesler, Phoenix, AZ (US); Lepolve Varpilah, Queen Creek, AZ (US)

(73) Assignee: OMCO SOLOR, LLC, Phoenix, AZ (US)

( * ) Notice: Subject to any disclaimer, the term of this patent is extended or adjusted under 35 U.S.C. 154(b) by 40 days.

(21) Appl. No.: 18/382,462

(22) Filed: Oct. 20, 2023

(65) Prior Publication Data
US 2024/0134398 A1    Apr. 25, 2024
US 2024/0231396 A9    Jul. 11, 2024

Related U.S. Application Data

(60) Provisional application No. 63/417,914, filed on Oct. 20, 2022.

(51) Int. Cl.
H02S 20/32      (2014.01)
G05D 3/10       (2006.01)
G06T 7/70       (2017.01)

(52) U.S. Cl.
CPC ............ G05D 3/105 (2013.01); G06T 7/70 (2017.01); H02S 20/32 (2014.12); G06T 2207/10032 (2013.01)

(58) Field of Classification Search
CPC . G05D 3/105; G06T 7/70; G06T 2207/10032; H02S 20/32; Y02E 10/47; Y02E 10/50
See application file for complete search history.

(56) References Cited

U.S. PATENT DOCUMENTS

| | | | |
|---|---|---|---|
| 7,884,308 B1 * | 2/2011 | Mejia | F24S 50/20 136/246 |
| 8,369,999 B2 | 2/2013 | Beck | |
| 8,939,648 B2 | 1/2015 | Schneider et al. | |
| 9,281,778 B2 | 3/2016 | Corio et al. | |
| 9,806,669 B2 | 10/2017 | DeWelle | |

(Continued)

Primary Examiner — Michael Y Sun
(74) Attorney, Agent, or Firm — George L. Pinchak

(57) ABSTRACT

A method of backtracking for a solar tracker installation utilizing a backtracking algorithm to calculate angles of inclination values for the tables of each of the solar tracker assemblies in the solar tracker installation during a backtracking period including morning backtracking period and evening backtracking period periods wherein the calculated table angles of inclination values mitigate undesirable shading of photovoltaic modules of a solar tracker assembly by adjacent row solar tracker assemblies during morning and evening backtracking periods that would otherwise occur with a normal solar tracking mode. Ends of the torque tube beam of each solar tracker assembly are imaged to provide three dimensional coordinates associated with the torque tube beam ends. Vertical position data is input to the backtracking algorithm, taking into account vertical differences of adjacent solar tracker assemblies in calculating table angles of inclination values for each of the solar tracker assemblies during the backtracking period.

27 Claims, 13 Drawing Sheets

(56) References Cited

U.S. PATENT DOCUMENTS

| | | |
|---|---|---|
| 10,415,974 B2 | 9/2019 | Judkins |
| 10,541,644 B2 | 1/2020 | Arliaud et al. |
| 10,557,646 B1 | 2/2020 | Ma et al. |
| 10,917,037 B2 | 2/2021 | Remy et al. |
| 10,944,354 B2 | 3/2021 | Ballentine et al. |
| 11,048,278 B2 | 6/2021 | Lee |
| 11,271,518 B2 | 3/2022 | Ballentine |
| 11,300,979 B2 | 4/2022 | Kesler et al. |
| 11,703,887 B2 | 7/2023 | Morse et al. |
| 2007/0277868 A1 | 12/2007 | Huang et al. |
| 2014/0306092 A1* | 10/2014 | Judkins .................. G05B 15/02 250/203.4 |
| 2019/0204405 A1 | 7/2019 | Arliaud et al. |
| 2020/0309893 A1 | 10/2020 | Arliaud et al. |
| 2021/0141047 A1* | 5/2021 | Ma .......................... F24S 50/20 |

\* cited by examiner

Backtracking Method Applied To Two Adjacent Row Solar Tracker Assemblies Within a Set of Solar Tracker Assemblies ─ 1100

Inputs to Backtracking Algorithm

- Three dimensional coordinates for ends of torque tube beam of first solar tracker assembly
- Three dimensional coordinates for ends of torque tube beam of second solar tracker assembly
- Horizontal distance between facing edges of the photovoltaic module of tables of first and second solar tracker assemblies
- Sun position data
- Light stripe width target range
- Range of angle of inclination of tables of first and second solar tracker assemblies

Backtracking Algorithm Calculations

- Calculate average horizontal distance between torque tube beams of the tables of the first and second solar tracker assemblies
- Calculate average vertical differential between the torque tube beams of the tables of the first and second solar tracker assemblies
- Calculate table angle of inclination values for first and second solar tracker assemblies such that a width of a hypothetical light stripe from sunlight passing between facing edge surfaces of the first set of photovoltaic modules of the table of the first solar tracker assembly and the second set of photovoltaic modules of the table of the second solar tracker assembly and projected onto the ground would be within the light stripe width target range TR

Backtracking Algorithm Outputs

- Output calculated backtracking table angle of inclination values (CAI) for first and second solar tracker assemblies Array controller communicates backtracking values (CAI) to solar tracker controllers of first and second solar tracker assemblies Solar tracker controllers actuate drive mechanism to set table angle of inclination in conformity with calculated backtracking table angle of inclination values (CAI) for the first and second solar tracker assemblies

FIG. 12

BACKTRACKING METHOD FOR SOLAR TRACKER INSTALLATION

CROSS REFERENCE TO RELATED APPLICATIONS

The following application claims priority under 35 U.S.C. § 119(e) to U.S. Provisional Patent Application Ser. No. 63/417,914, filed Oct. 20, 2022, entitled Backtracking Method for Solar Tracker Installation. The above-identified U.S. provisional patent application is incorporated by reference herein in its entirety for any and all purposes.

TECHNICAL FIELD

The present disclosure relates to a method of backtracking for a solar tracker installation and, more specifically, to a method of backtracking utilizing a backtracking algorithm to calculate angles of inclination for the tables of each of the solar tracker assemblies in the solar tracker installation during a backtracking period, including post-sunrise, morning backtracking period and a pre-sunset evening backtracking period, wherein the calculated table angles of inclination values calculated by the backtracking algorithm are utilized to set table angles of inclination in place of table angle of inclination positions that would otherwise be used in a normal solar tracking mode to mitigate undesirable shading of photovoltaic modules of a solar tracker assembly by adjacent row solar tracker assemblies during morning and evening backtracking periods that would otherwise occur with the normal tracking mode and an apparatus, such as a solar tracker control system, for implementing the method of backtracking and further wherein a drone is utilized to image ends of a torque tube beam of each solar tracker assembly of the solar tracker installation so that three dimensional coordinates associated with the ends of each of the solar tracker assemblies of the installation are precisely know such that the three dimensional coordinates, including vertical position data, can be input to the backtracking algorithm, which takes into account vertical differences in the height of adjacent solar tracker assemblies in calculating table angles of inclination for each of the solar tracker assemblies during a backtracking period.

BACKGROUND

Various types of solar trackers or solar tracker assemblies are known including horizontal, single axis solar tracker assemblies. A solar tracker installation may include a plurality of horizontal, single axis solar tracker assemblies positioned in spaced apart, parallel rows on an installation site. The installation site is a plot of land that the solar tracker installation is physically situated on. A horizontal, single axis solar tracker assembly typically includes a torque tube beam and a plurality of photovoltaic modules, sometimes referred to as solar modules or panels. The plurality of photovoltaic modules is coupled to the torque tube beam via a frame which typically includes various components including mounting brackets, clamps and fasteners. The torque tube beam of a solar tracker assembly is typically comprised of one or more torque tube beam segments. When multiple torque tube beam segments are utilized, they may be affixed in a linear fashion by couplers or splicing members which couple together end portions of adjacent torque tube beam segments. A typical solar tracker assembly may include ten 40-foot torque tube beam segments for a total length of the torque tube beam (and a total length of the solar tracker assembly) extending 400 feet. The modules of the plurality of photovoltaic modules are typically spaced uniformly along the torque tube beam by the frame mounting brackets. The solar tracker assemblies are typically oriented in a north—south direction on the installation site so that the plurality of photovoltaic modules of each solar tracker assembly of the installation may be pivoted in an east—west direction to follow or track a position of the sun as the sun moves across the sky from east to west.

In a solar tracker installation, a number of parallel solar tracker assemblies extend in a north—south direction so that the table of each of the solar tracker assemblies can pivot to allow the plurality of photovoltaic modules of a solar tracker assembly to follow the path or arc of the sun as it moves across the sky during daylight hours to thereby maximize energy output during daylight hours. Each solar tracker assembly may be considered as a row in a set of aligned, parallel rows of solar tracker assemblies of the installation. For each solar tracker assembly, a table of the solar tracker assembly is driven by the drive mechanism. The table is pivoted or rotated though an angle of inclination range AIR of the table such that the plurality of photovoltaic modules track the sun as it moves across the sky during daylight hours. That is, within the constraints of the table angle of inclination range AIR, the table pivots such that upper surfaces of the plurality of photovoltaic modules are facing the sun (or are normal to the sun), as the sun moves across the sky from east to west, to maximize energy output by the photovoltaic modules.

In some solar tracker assemblies, the table angle of inclination range AIR is 120 degrees, which means that the table can be rotated or pivoted to a negative angle of inclination of −60 degrees (maximum negative angle of inclination AI−) from horizontal to face in the easterly direction (facing the morning sun) and can be rotated or pivoted to a positive angle of inclination of +60 degrees (maximum positive angle of inclination AI+) from horizontal to face in the westerly direction (facing the evening sun). When the sun is at its apex (solar noon) in the sky, the table would be pivoted such that upper surfaces of the plurality of photovoltaic panels would typically be in a horizontal position for maximum sun exposure. This would correspond to a neutral position or zero angle of inclination AIN of the table.

As noted above, in a solar tracker installation, typically there is an aligned set of solar tracker assemblies comprising parallel rows of spaced apart solar tracker assemblies, each row of the set being a solar tracker assembly and extending in a north-south direction and uniformly spaced apart in the east-west direction. In order to maximize the energy production of the solar tracker installation, it is desirable to have a pitch distance or spacing between the centers of adjacent parallel rows of solar tracker assemblies be relatively small to maximize the number of solar tracker assemblies operating on the site of the solar tracker installation. However, there is a tradeoff in determining pitch distance. Specifically, the smaller the pitch distance, that is, the closer the adjacent rows of solar tracker assemblies are positioned, as measured in the east-west direction, the greater the tendency for photovoltaic modules of adjacent solar tracker assemblies to shade each other during post sunrise, early morning hours and pre-sunset, late evening hours, if the solar tracker assemblies of a set of solar tracker assemblies are in normal or true solar tracking mode. In the normal solar tracking mode, the associated solar tracker controller utilizes a predetermined table of sun positions for each day of each year of the operating life of the solar tracker assembly and operates to pivot the table of its solar tracker assembly in accordance with the sun positions such that the upper surfaces of the plurality of photovoltaic modules point at the sun (that is, the upper surfaces of the modules are normal or orthogonal to the position of the sun) as the sun moves across the sky, within, of course, the angle of inclination range (AIR) of the table.

In the normal tracking mode, at sunrise and sunset, the table of the solar tracker assembly would be pivoted to maximum negative and positive angles of inclination AI−, AI+ in an attempt to point the plurality of photovoltaic modules at the sun's position. That is, during early morning hours, if the normal tracking mode is utilized, the tables of the solar tracker assemblies of the installation would all be pivoted or rotated to a maximum negative angle of inclination AI−, which, for example, may be −60 degrees. However, in such a maximum negative angle of inclination when the sun low in the eastern sky, the steeply angled plurality of photovoltaic modules of the most easterly positioned solar tracker assembly would tend to shade a portion of the plurality of photovoltaic modules of the adjacent (that is, the second most easterly) solar tracker assembly. The plurality of photovoltaic modules of the second most easterly positioned solar tracker assembly would, in turn, tend to shade a portion of the plurality of photovoltaic modules of the adjacent (that is, the third most easterly) solar tracker assembly and so on, along the entire set of aligned, parallel rows of solar tracker assemblies. Since, the photovoltaic modules of a solar tracker assembly are typically connected in series, if even one of the photovoltaic modules of a solar tracker assembly is shaded, this will significantly reduce the energy output of the plurality of photovoltaic modules of the solar tracker assembly. The shading problem similarly occurs prior to sunset. In this situation, the tables of the solar tracker assemblies of the installation would all have their respective tables at the maximum positive angle of inclination AI+, for example, +60 degrees. The steeply angled plurality of photovoltaic modules of the most westerly solar tracker assembly would tend to shade a portion of the plurality of photovoltaic modules of the adjacent (second most westerly) solar tracker assembly, the steeply angled plurality of photovoltaic modules of the second most westerly solar tracker assembly would tend to shade a portion of the plurality of photovoltaic modules of the adjacent third most westerly solar tracker assembly and so on, along the entire set of aligned, parallel rows of solar tracker assemblies. Hence, shading of adjacent photovoltaic modules of a solar tracker assembly during early morning or late evening periods is a significant problem. The shading problem described above may be further exacerbated if the ground level of the installation site undulates over an extent of the solar tracker installation site. For example, if a portion of the site that includes the most easterly positioned solar tracker assembly is vertically higher over certain portions of the length or longitudinal extent of the torque tube beam as compared to the torque tube beam of the corresponding second most easterly solar tracker assembly, some or all of the photovoltaic modules of the of the most easterly positioned solar tracker assembly may be higher vertically, as compared to the corresponding photovoltaic modules of the second most easterly solar tracker assembly. During early morning hours, this vertical differential between the greater height of the photovoltaic modules of the most easterly positioned solar tracker assembly versus the lower height of the photovoltaic modules of the second most easterly solar tracker assembly would increase a duration of the shading of the photovoltaic modules of the second most easterly solar tracker assembly by the corresponding photovoltaic modules of the most easterly positioned solar tracker assembly. Accordingly, the height differential between adjacent solar tracker assemblies may exacerbate the row-to-row shading problem by: a) increasing a portion of daylight hours during which a shading problem exists thereby decreasing energy output of the second most easterly solar tracker assembly for a longer duration than would otherwise be the case if the ground were level; and/or b) increasing an area of the shaded region of the second most easterly solar tracker assembly at a given post-sunrise time thereby increasing the energy output loss of the second most easterly solar tracker assembly.

SUMMARY

In one aspect, the present disclosure relates to a method of backtracking utilizing a backtracking algorithm to calculate angle of inclination positions for a first table of a first solar tracker assembly and angle of inclination positions for a second table of a second solar tracker assembly, the first and second solar tracker assemblies being adjacent row solar tracker assemblies within a solar tracker installation, to mitigate shading of a first set of photovoltaic modules of the first table of the first solar tracker assembly by a second set of photovoltaic modules of the second table of the second solar tracker assembly, the steps of the method comprising: a) imaging at least one selected element of the first solar tracker assembly and utilizing images of the at least one selected element to determine three dimensional coordinates associated with the first solar tracker assembly; b) imaging at least one selected element of the second solar tracker assembly and utilizing images of the at least one selected element to determine three dimensional coordinates associated with the second solar tracker assembly; c) inputting to the backtracking algorithm: 1) the three dimensional coordinates associated with the first solar tracker assembly; 2) the three dimensional coordinates associated with the second solar tracker assembly; 3) a chord value for the first set of photovoltaic modules of the first table of the first solar tracker assembly and a chord value for the second set of photovoltaic modules of the second table of the second solar tracker assembly; 4) an angle of inclination range for the first table and an angle of inclination range for the second table; and 5) sun position data; d) the backtracking algorithm calculating first angle of inclination values for the first table of the first solar tracker assembly and calculating second angle of inclination values for the second table of the second solar tracker assembly; and e) pivoting first table of the first solar tracker assembly in accordance with the first angle of inclination values and pivoting the second table of the second solar tracker assembly in accordance with the second angle of inclination values.

In another aspect, the present disclosure relates to a method of backtracking utilizing a backtracking algorithm to calculate angle of inclination positions for a first table of a first solar tracker assembly and angle of inclination positions for a second table of a second solar tracker, the first and second solar tracker assemblies being adjacent row solar tracker assemblies within a solar tracker installation, to mitigate shading of a first set of photovoltaic modules of the first table of the first solar tracker assembly by a second set of photovoltaic modules of the second table of the second solar tracker assembly, the steps of the method comprising: a) determining three dimensional coordinates for at least one element of the first solar tracker assembly, the three dimensional coordinates associated with the first solar tracker assembly; b) determining three dimensional coordinates for at least one element the second solar tracker assembly, the three dimensional coordinates associated with the second solar tracker assembly; c) inputting to the backtracking algorithm: 1) the three dimensional coordinates associated with the first solar tracker assembly; 2) the three dimensional coordinates associated with the second solar tracker assembly; 3) a chord value for the first set of photovoltaic modules of the first table of the first solar tracker assembly and a chord value for the second set of photovoltaic modules of the second table of the second solar tracker assembly; 4) an angle of inclination range for the first table and an angle of inclination range for the second table; and 5) sun position data; d) the backtracking algorithm calculating first angle of inclination values for the first table of the first solar tracker assembly and calculating second angle of inclination values for the second table of the second solar tracker assembly; and e) pivoting first table of the first solar tracker assembly in accordance with the first angle of inclination values and pivoting the second table of the second solar tracker assembly in according with the second angle of inclination values.

In another aspect, the present disclosure relates to a method of method of determining three dimensional coordinates for each solar tracker assembly of a first set of solar tracker assemblies, the first set of solar tracker assemblies being adjacent row solar tracker assemblies within a solar tracker installation, for each of the solar tracker assemblies of the set of solar tracker assemblies includes a table pivoting about an angle of inclination, the table including a torque tube and set of photovoltaic modules coupled to and pivoting with the torque tube, the steps of the method comprising: a) imaging at least one element of a first solar tracker assembly of the first set of solar tracker assemblies; b) analyzing the image data to identify the at least one element of the first solar tracker assembly; c) determining three dimensional coordinates for the at least one element of the solar tracker assembly; d) associating the three dimensional coordinates with the first solar tracker assembly; and e) repeating steps (a) through (d) for each solar tracker assembly of the first set of solar tracker assemblies.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 12 is a simplified flow chart of the backtracking algorithm of the backtracking method of the present disclosure, as applied to two adjacent row solar tracker assemblies of a first set of adjacent, aligned rows of spaced apart solar tracker assemblies;

DETAILED DESCRIPTION

Figure 1:
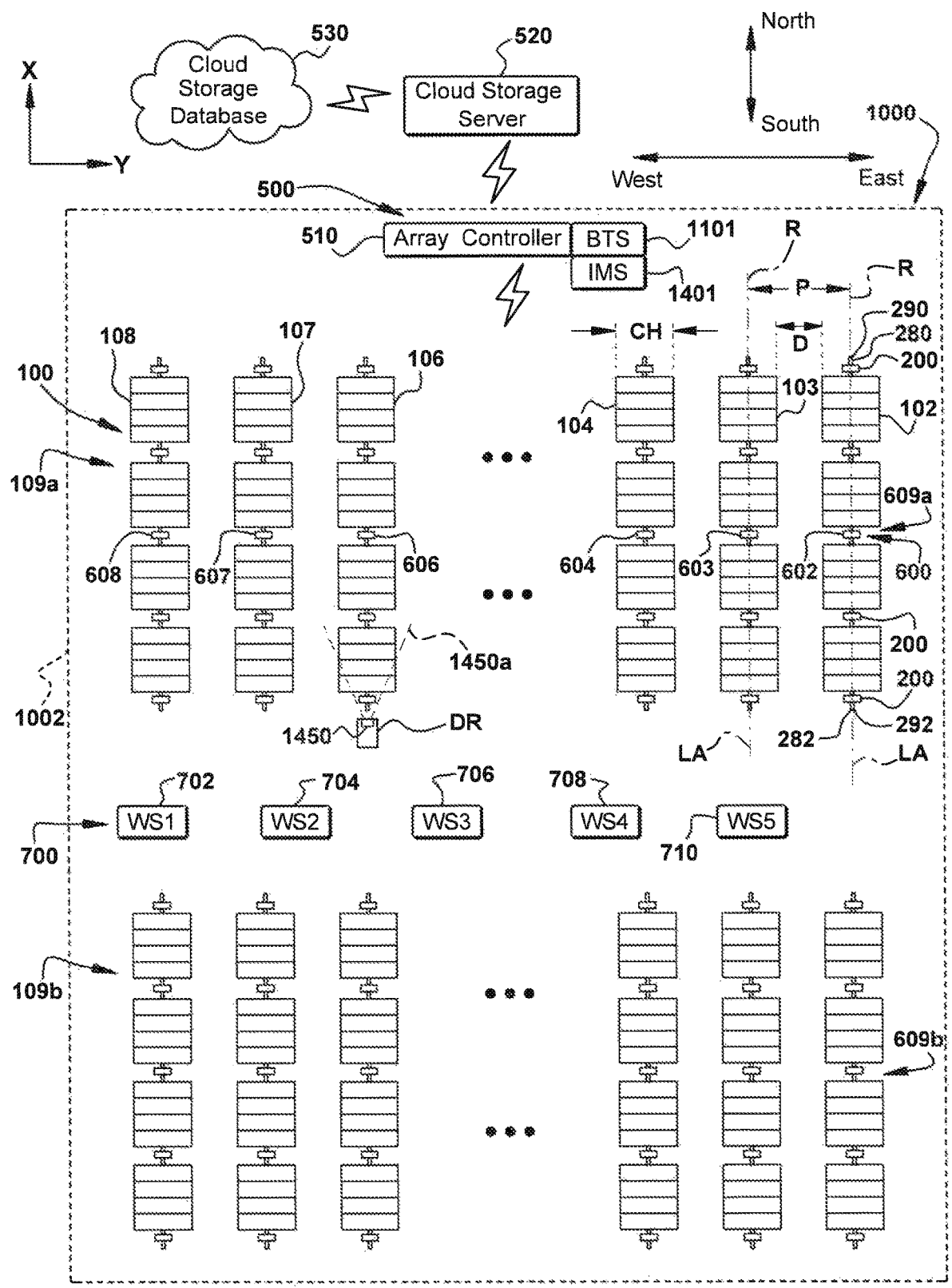
FIG. 1 is a schematic top perspective view of a solar tracker installation including a plurality of a single row, horizontal, single axis solar tracker assemblies on a solar tracker installation site, the solar installation including two sets of solar tracker assemblies, each set of solar tracker assemblies including adjacent, aligned rows of spaced apart solar tracker assemblies of the plurality of solar tracker assemblies, each solar tracker assembly of the plurality of solar tracker assemblies including a drive mechanism and a pivoting table, the table including a torque tube beam including a plurality of torque tube beam segments, a plurality of photovoltaic modules; a frame for supporting the plurality of photovoltaic modules, and a plurality of bearing apparatus for rotatably supporting the torque tube beam, associated with each solar tracker assembly is a solar tracker controller that controls the drive mechanism that pivots the table through an angle of inclination range so that the plurality of photovoltaic modules track the sun as the sun moves across the sky, the solar tracker installation including a control and communications systems including an array controller in communication with each of the solar tracker controllers.

The present disclosure relates a method of backtracking 1100 that utilizes a backtracking algorithm 1120 to calculate backtracking angles of inclination CAI for respective tables 110 of a plurality of solar tracker assemblies 100 of a solar tracker installation 1000 during a backtracking period BT. The present disclosure also relates to a method of imaging 1400 that provides three dimensional location data regarding each of the solar tracker assemblies of the plurality of solar tracker assemblies 100 of the installation 1000. The imaging method 1400 is used in conjunction with or can be considered as part of the backtracking method 1100. Advantageously, the three dimensional location data or three dimensional coordinate data or values generated by the imaging method 1400 are input to the backtracking algorithm 1120 to enable improved calculated backtracking angle of inclination values CAI by the backtracking algorithm 1120 to mitigate row-to-row shading during morning and evening backtracking periods BTM, BTE for each of the solar tracker assemblies of the plurality of solar tracker assemblies 100 of the solar tracker installation 1000. The method of imaging 1400 may be implemented on imaging software 1401, just as the backtracking method 1100 may be implemented on backtracking software 1101 (FIG. 1). The backtracking software 1121 and the imaging software 1401 may be part of a unified set of control software modules of the solar tracker installation 1000 or they may be stand-alone software modules. The method of imaging 1400 may be viewed as a part of or subsidiary to the method of backtracking 1100. The plurality of solar tracker assemblies 100 of the solar tracker installation 1000 are located on a solar tracker installation site 1002.

In one exemplary or example embodiment, each of the plurality of solar tracker assemblies 100 is a horizontal, single axis solar tracker assembly. The installation site 1002 of the solar tracker installation 1000 is schematically depicted as a geographic area within the bounds of a dashed line labeled 1002 in FIG. 1, however, it should be understood that the site 1002 could include two or more geographic areas or plots of land that are non-contiguous. The solar tracker installation 1000 includes the plurality of solar tracker assemblies 100. Each solar tracker assembly of the plurality of solar tracker assemblies 100 operates under the control of an associated different one of a plurality of solar tracker controllers 600. In one exemplary or example embodiment, each of the plurality of solar tracker controllers 600 is located in proximity to or mounted on its associated solar tracker assembly, the solar tracker controllers 600 are part of a solar tracker control and communications system 500.

In one exemplary or example embodiment, the solar tracker assemblies 100 of the solar tracker installation 1000 are arranged in one or more sets of parallel, aligned, spaced apart solar tracker assemblies on the installation site 1002. For example, FIG. 1 schematically illustrates the solar tracker installation 1000 wherein the plurality of solar tracker assemblies 100 includes two geographically separated sets of solar tracker assemblies, namely, a first set of solar tracker assemblies 109a and a second set of solar tracker assemblies 109b, located on the installation site 1002. As schematically depicted in FIG. 1, each of the sets of solar tracker assemblies 109a, 109b includes a plurality of solar tracker assemblies or adjacent, aligned or parallel rows of solar tracker assemblies. For example, the first set of solar tracker assemblies 109a includes parallel, spaced solar tracker assemblies or rows 102, 103, 104, 106, 107, 108, each extending in a north-south direction. Each row 102, 103, 104, 106, 107, 108 is substantially parallel to and aligned with its adjacent solar tracker assembly or assemblies of the first set 109a. For example, in the first set solar tracker assemblies 109a, an eastern most solar tracker assembly 102 is aligned with, that is, parallel to, and adjacent to a second most eastern solar tracker assembly 103. The second most eastern solar tracker assembly 103 is parallel to and adjacent to the eastern most solar tracker assembly 103 and a third most eastern solar tracker assembly 104. Similarly, looking at the western most solar tracker assemblies of the first set 109a, a western most solar tracker assembly 108 is aligned with, that is, parallel to, and adjacent to a second most western solar tracker assembly 107. The second most western solar tracker assembly 107 is parallel to and adjacent to the western most solar tracker assembly 108 and a third most western solar tracker assembly 106. Each set of solar tracker assemblies 109a, 109b are geographically spaced apart. For brevity, the discussion herein will focus on the first set of solar tracker assemblies 109a, it being understood that the same discussion and analysis would equally apply to all other sets of solar tracker assemblies of the solar tracker installation 1000, which may be greater than two sets, especially in large scale or utility scale solar tracker installations. Additionally, only representative eastern and western solar tracker assemblies 102, 103, 104, 106, 107, 108 of the first set of solar tracker assemblies 109a are schematically illustrated in FIG. 1, it should be understood that the first set of solar tracker assemblies 109a will include many additional solar tracker assemblies between rows 104, 106, the presence of additional solar tracker assemblies is represented schematically by the ellipsis or series of three dots in FIG. 1.

Each solar tracker assembly of the plurality of solar tracker assemblies 100 includes a table 110 that pivots through an angle of inclination range AIR to track the position of the sun as the sun moves across the sky from east to west. An angle of inclination AI of a table of individual solar tracker assemblies 102, 103, 104, 106, 107, 108 is controlled by an associated solar tracker controller 602, 603, 604, 606, 607, 608 of the plurality of solar tracker controllers 600. For example, in the first set of solar tracker assemblies 109a, a table angle of inclination AI of the eastern most solar tracker assembly 102 of the first set of solar tracker assemblies 109a is controlled by its associated solar tracker controller 602 of a first set of solar tracker controllers 609a of the plurality of solar tracker controllers 600, a table angle of inclination AI of the second most easterly solar tracker assembly 103 of the first set of solar tracker assemblies is controlled by its associated solar tracker controller 603 of the first set of solar tracker controllers 609a of the plurality of solar tracker controllers 600, etc.

The solar tracker controller 602, via a drive mechanism 150 of the solar tracker assembly 102, controls an angle of inclination AI of a table 110 of the solar tracker assembly 102. Each of the plurality of solar tracker assemblies 100, for example, the solar tracker assembly 102, includes a plurality of photovoltaic modules 190 mounted to and supported by a torque tube beam 250. The plurality of photovoltaic modules 190 are affixed to the torque tube beam 250 by a frame 120. The torque tube beam 250, in turn, is supported for rotation or pivoting about an axis of rotation R by a plurality of bearing apparatuses 200 positioned at spaced apart locations along the torque tube beam 250. Each bearing apparatus of the plurality of bearing apparatuses 200 includes a rotatable or rotating bearing assembly 210 supported by a stationary saddle assembly 220. The rotatable bearing assembly 210 includes a torque tube beam slot 212 which receives the torque tube beam 250.

In one example or exemplary embodiment, the method of backtracking 1100 (and associated backtracking software 1101) of the present disclosure is advantageously implemented or executed by a central controller or array controller 510 of the solar tracker control and communications system 500 of the solar tracker installation 1000, although it should be recognized that the backtracking method 1100 could be executed by one or more solar tracker installation components having a microprocessor or microcontroller to execute the calculations of the method 1100 and issue appropriate control signals to a plurality of solar tracker controllers 600 associated with the plurality of solar tracker assemblies 100. In one exemplary or example embodiment, the plurality of solar tracker controllers 600 are part of the solar tracker control and communications system 500 of the solar tracker installation 1000. Similarly, the method of imaging 1400 (and associated imaging software 1401) of the present disclosure is advantageously implemented or executed by the central controller or array controller 510 of the solar tracker control and communications system 500. Alternately, the imaging method 1400 may be executed by a stand-alone or networked computer which is not part of the solar tracker control and communications system 500.

The control and communications system 500 advantageously employs a long-range, radio frequency, sub GHz, wireless data communications protocol and a star wireless communications network configuration 502 to allow for centralized control of the installation 1000 by the array controller 510 and provide for efficient, wireless transmission of data and control signals between the array controller 510, the plurality of solar tracker controllers 600, and a plurality of weather sensors 700. The plurality of weather sensors 700 of the solar tracker installation 1000 will typically include anemometers (wind speed sensors), snow sensors for detection of snow accumulation on the upper surfaces of a plurality of photovoltaic modules 190 of a solar tracker assembly 102, and sunlight or irradiance sensors that are used to determine overcast sky conditions. The plurality of wind speed, snow detection weather sensors, and irradiance sensors are schematically depicted as weather sensors WS1 702, WS2 704, WS3 706, WS4 708, WS5 710 in FIG. 1.

The array controller 510 receives wireless communications from the plurality of weather sensors 700 regarding weather-related data and receives wireless communications from the plurality of solar tracker controllers 600 regarding operating and maintenance data of the associated plurality of solar tracker assemblies 100. The array controller 510, in turn, wirelessly communicates control signals to each of the plurality of solar tracker controllers 600, for example, solar tracker controller 602, indicating: a) what operating mode the solar tracker controller 602 should operate its associated solar tracker assembly 102 in; and/or b) what the angle of inclination AI of the table 110 of its associated solar tracker assembly 102 should at. Additionally, the control and communications system 500 additionally includes storage of selected data regarding operation and maintenance of the solar track installation 1000, allowing for remote, real-time access to stored operating and maintenance data by owners/operators of the solar tracker installation 1000 via smart devices. In one exemplary embodiment, the array controller 510 stores operating and maintenance data in a cloud storage database 530 utilizing a cloud storage server 520, which may be remote from the installation site 1002. Communications from the array controller 510 to the cloud storage server 520 may be via a router (which is part of electronics of the array controller 510) or via a cellular network. Additional details of the function and configuration of the solar tracker control system 500 are found in U.S. non-provisional patent application Ser. No. 17/746,322, filed May 17, 2022, and assigned to the assignee of the present application. Application Ser. No. 17/746,322 is incorporated by reference herein in its entirety.

It should be appreciated that the angles of inclination AI for the solar tracker assemblies for example, solar tracker assembly 102 may be calculated either by: a) the array controller 510 and then communicated to the solar tracker controller 602 by the array controller 510 and calculated angles of inclination are implemented by the solar tracker controller 602 to control/change the angle of inclination AI of the associated solar tracker assembly 102; or b) the solar tracker controller 602, wherein the solar tracker controller 602 utilizes the calculated angles of inclination to control/change the angle of inclination AI of the associated solar tracker assembly 102. Where the calculation of the angles of inclination for a solar tracker assembly 102 are performed is a matter of design choice and the present disclosure contemplates multiple options, including the options set forth above.

Solar Tracker Assembly 100 and Solar Tracker Controller 602

For simplicity, when discussing the plurality of solar tracker assemblies 100 of the solar tracker installation 1000, a representative solar tracker assembly, namely, solar tracker assembly 102, will be referenced with the understanding that the description of the solar tracker assembly 102 is applicable to each of the solar tracker assemblies of the plurality of solar tracker assemblies 100. Similarly, when discussing the plurality of solar tracker controllers 600 associated with respective solar tracker assemblies of the plurality of solar tracker assemblies 100, a representative solar tracker controller, namely, solar tracker controller 602, will be referenced with the understanding that the description of the solar tracker controller 602 is applicable to each of the solar tracker controllers of the plurality of solar tracker controllers 600. The solar tracker assembly 102 includes the pivoting table 110 which is pivoted about the axis of rotation R by the drive mechanism or drive actuator 150 of the solar tracker assembly 102. The table 110 includes everything that pivots or swings about the axis of rotation R of the table 110. The table 110 of the solar tracking assembly includes: a) the torque tube beam 250 including a plurality of torque tube beam segments, portions of four torque tube beam segments are schematically depicted in FIG. 4, namely, torque tube beam segments 265, 270, 275, 280; b) the plurality of photovoltaic modules 190; c) a frame 120 which affixes or secures the plurality of photovoltaic modules 190 to the torque tube beam 250; d) the rotatable bearing assemblies 210 of the plurality of solar tracker bearing apparatuses 200 that support the torque tube beam 250 for pivoting movement such that the table 110 may pivot or rotate about the table axis of rotation R; and e) a pivoting portion of the drive mechanism 150, which is coupled to the torque tube beam 250 via one or more drive journals and rotates or pivots the table about the table axis of rotation R.

Figure 2:
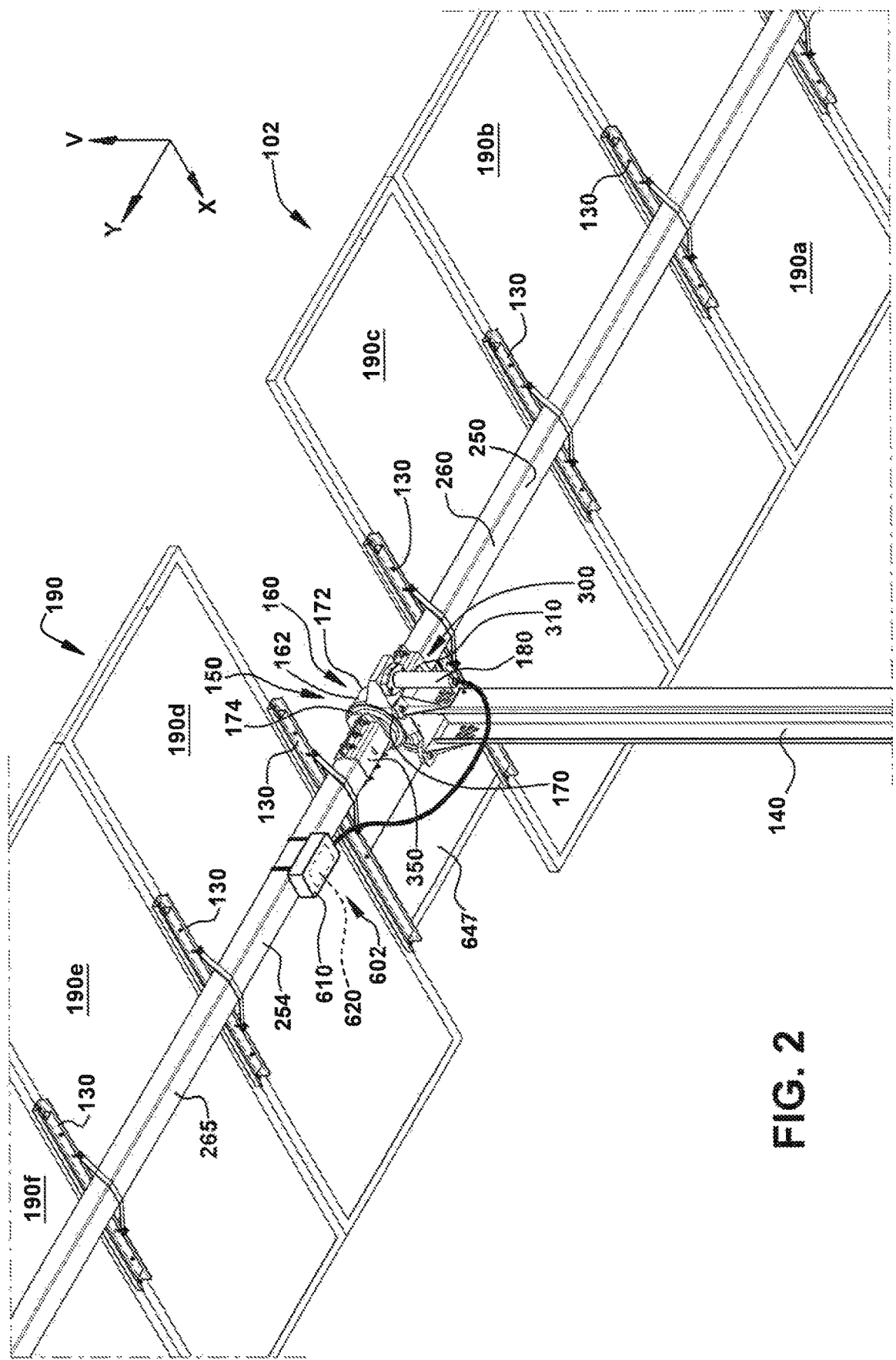
FIG. 2 is a schematic bottom perspective view of a portion of a representative solar tracker assembly of the plurality of solar tracker assemblies of the solar tracker installation of FIG. 1, including a solar tracker controller associated with the solar tracker assembly operatively coupled to a drive mechanism of the solar tracker assembly, the solar tracker controller operating via the drive mechanism to change an angle of inclination of the solar tracker, the solar tracker controller including a dedicated photovoltaic module for providing power to the solar tracker controller.

In one exemplary embodiment, the solar tracker assembly 102 is a single row, horizontal, single axis solar tracker assembly wherein the table 110 of the solar tracker assembly 102 is rotated or pivoted by the drive mechanism 150 through the angle of inclination range AIR (schematically depicted in FIG. 5) to track movement of the sun across the sky/horizon. The drive mechanism 150 of the solar tracker assembly 102 is controlled by the solar tracker controller 602. As schematically depicted in FIG. 2, the solar tracker controller 602 includes controller electronics 620 enclosed in a housing 610. The controller electronics 620 includes an actuator for actuating the drive mechanism 150 of the solar tracker assembly 102. In one exemplary embodiment, the drive mechanism 150 of the representative solar tracker assembly 102 comprises a single drive motor 180 operatively coupled to a single slew drive or slew gear drive 160, which pivots the table 110 through the predetermined angle of inclination range AIR. However, one of skill in the art would appreciate that the concepts of the present disclosure are equally applicable to solar tracker systems where multiple slew drives are utilized along an extent of the table to pivot the table 110. In one exemplary embodiment, the drive motor 180 is a DC drive motor. However, it should be recognized that the drive motor 180 may alternatively be an AC drive motor. Utilizing an AC drive motor, however, will require routing of AC power lines to the AC drive motors of each of the plurality of solar tracker assemblies 100. Use of an AC drive motor is within the scope of the present disclosure. If an AC drive motor is utilized, the actuator of the associated solar tracker controller 602 will be an AC motor driver, as opposed to the DC motor driver.

The drive mechanism 150 of the solar tracker assembly 102 operates under the control of the solar tracker controller 602 to pivot or rotate the table 110, including the plurality of photovoltaic modules 190, about the table axis of rotation R. Disposed within the stationary housing 162 is a gear train of the slew drive 160 which is operatively coupled to and drives the rotating drive member 170 about a drive mechanism axis of rotation. An output shaft of the DC motor 180 is operatively connected to a gear train of the slew drive 160 such that rotation of the output shaft of the DC motor 180 rotates the slew drive gear train. The slew drive gear train, in turn, is operatively coupled to the rotating drive member 170 of the slew drive 160 such that actuation of the DC motor 180 and rotation of the DC motor output shaft causes a proportional and precise rotation of the rotating drive member 170 of the slew drive 160. This rotation of the slew drive rotating drive member 170, in turn, precisely rotates the table 110 of the solar tracker assembly 102 to a desired table angle of inclination AI. That is, rotation of the rotating drive member 170 of the slew drive 160 by the DC motor 180 causes a precise rotation of the table 110 of the solar tracker assembly 102 to a desired table angle of inclination AI (within, of course, the limits of the table angle of inclination range AIR).

Figure 3:
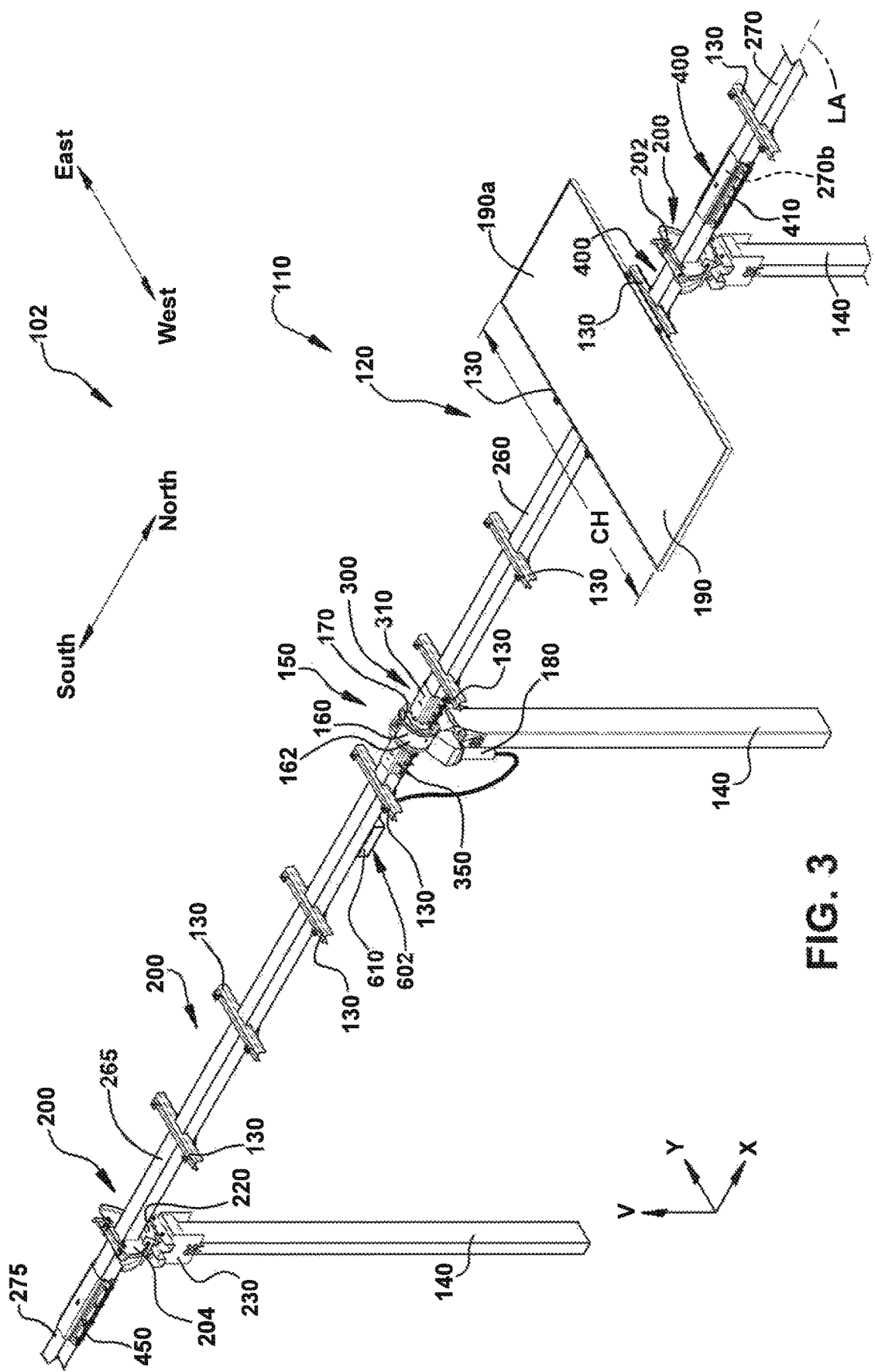
FIG. 3 is a schematic top perspective view of a portion of the representative solar tracker assembly of FIG. 2, with all but one of the plurality of photovoltaic modules and the dedicated photovoltaic modules of the solar tracker controller removed to facilitate viewing of components of the table.
Figure 4:
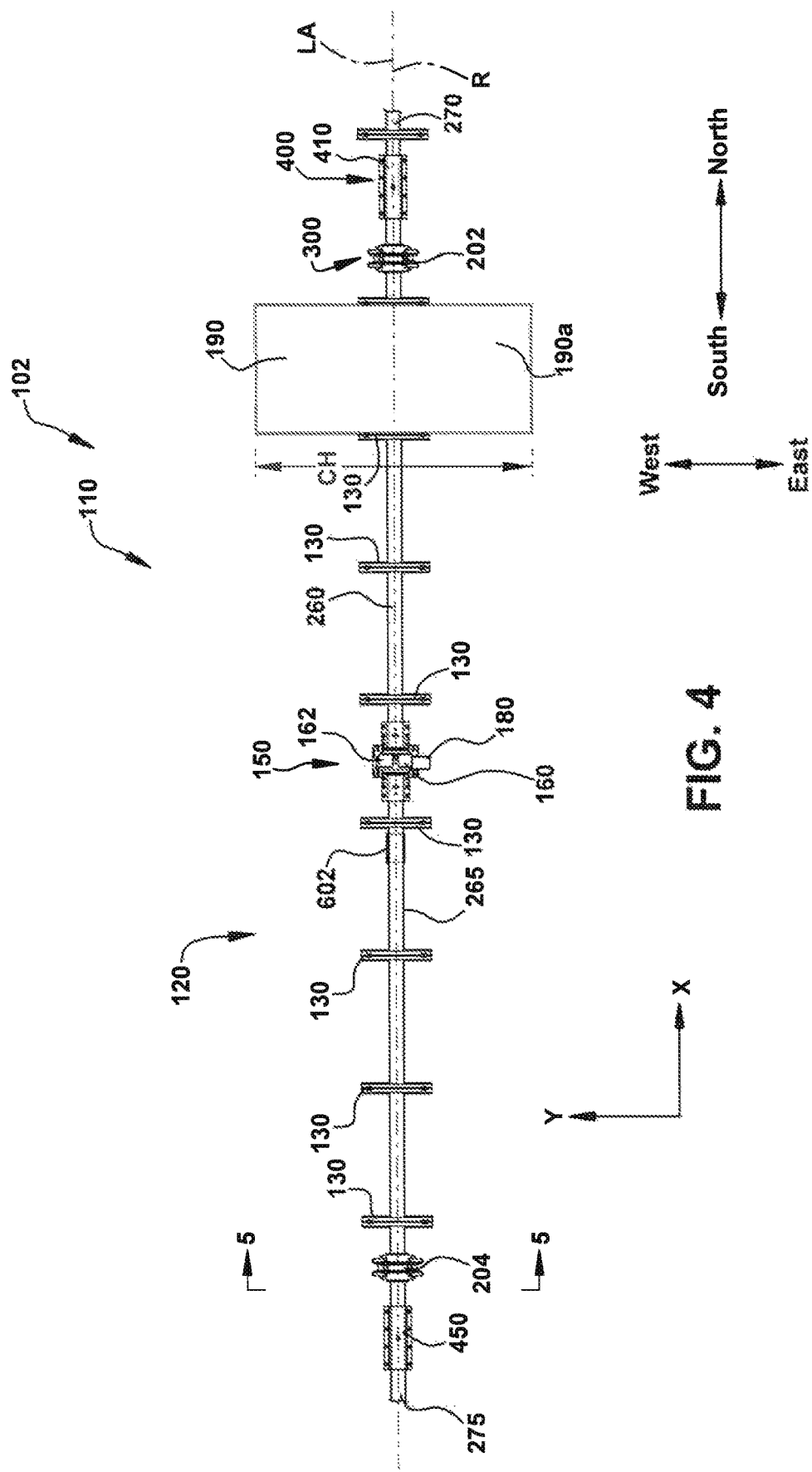
FIG. 4 is a schematic top plan view of the representative solar tracker assembly of FIG. 3.

As best seen in FIGS. 2-5, the representative solar tracker assembly 102 includes the drive mechanism 150 to rotate a table 110 of the solar tracker assembly 100 about a table axis of rotation R through the predetermined angle of inclination range AIR, that is, between the maximum negative and positive angles of inclination AI- and AI+. The table 110 of the solar tracker assembly 102 includes the frame 120 supporting a plurality of photovoltaic modules 190, including, as schematically depicted in FIG. 2, representative photovoltaic modules 190a, 190b, 190c, 190d, 190e, 190f. The rotatable torque tube beam 250 of the table 110, in turn, supports the frame 120. The plurality of bearing apparatuses 200, including representative bearing apparatuses 202, 204, in turn, rotatably support the torque tube beam 250. The torque tube beam 250 is comprised of a plurality of aligned and couple torque tube beam segments. In FIGS. 3 and 4, portions of four torque tube beam segments, namely, first, second, third and fourth torque tube beam segments 260, 265, 270, 275 of the torque tube beam 250 are schematically depicted, it being understood that the solar tracker assembly 100 includes additional torque tube beam segments not shown. The plurality of bearing apparatuses 200 are advantageously configured and positioned such that, other than the first and second torque tube beam segments 260, 265 of the torque tube beam 250 adjacent the drive mechanism 150, the table axis of rotation R, is vertically aligned with, that is, would pass through or be acceptably close, for design purposes, to passing through a center of gravity or center of mass of the table 110.

Figure 5:
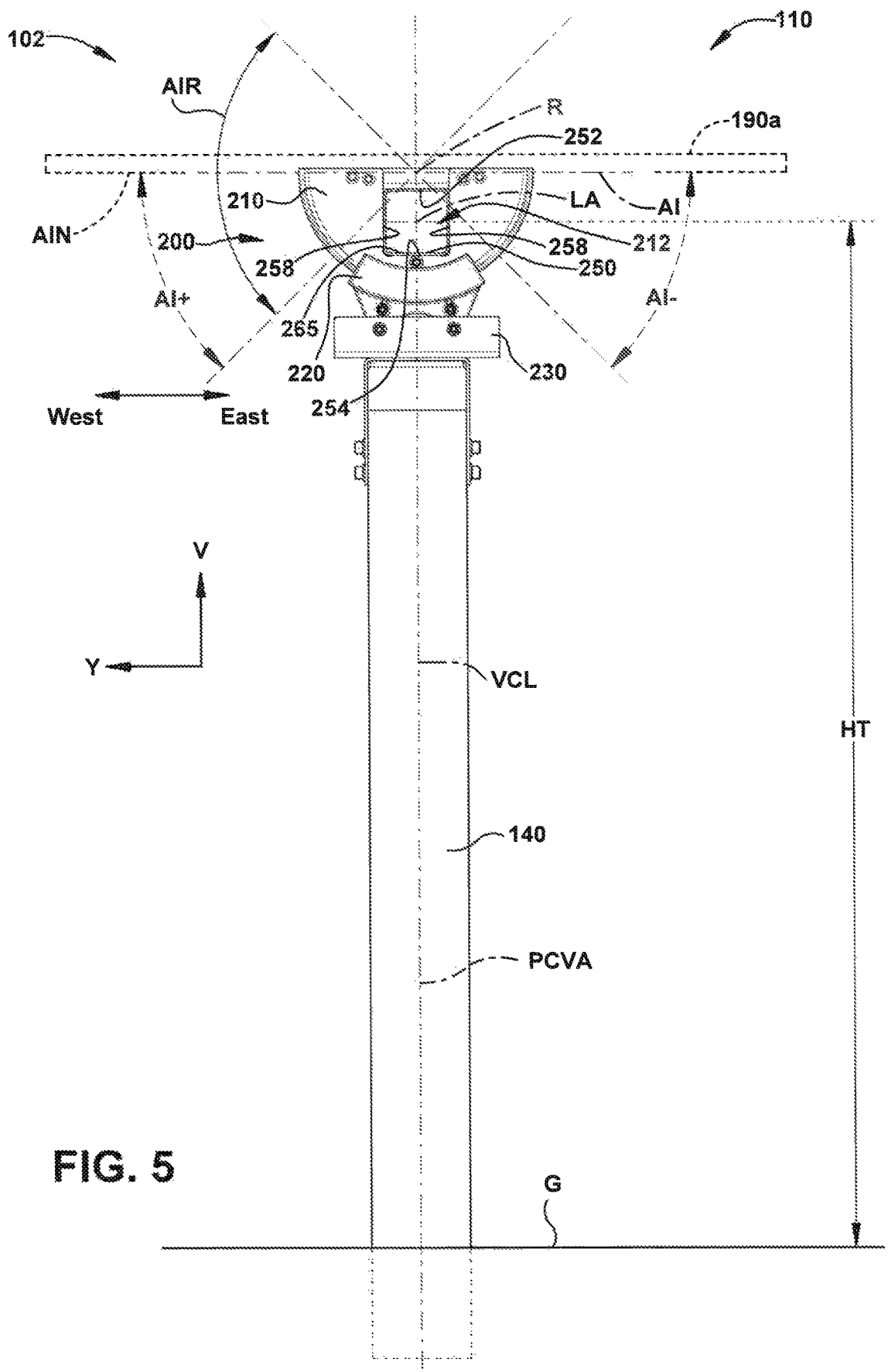
FIG. 5 is a schematic vertical section view of the representative solar tracker assembly of FIG. 2, as seen from a plane indicated by the line 5-5 in FIG. 4, schematically depicting the angle of inclination range of the table.

In one example or exemplary embodiment, the torque tube beam 250 comprises a hollow metal tube that is substantially square in cross section, having an open interior that is centered about a central longitudinal axis LA. In one exemplary embodiment, the torque tube beam 250 is approximately 100 mm. by 100 mm. (approximately 4 in. by 4 in.) and includes an upper wall 252 and the lower wall 254 spaced apart by parallel side walls 258. The torque tube beam 250 extends along the longitudinal axis LA of the torque tube beam 250 and, as noted above, extends generally parallel to the ground G (FIG. 5). Hence, as the ground is generally horizontal, the solar tracker assembly is referred to as a horizontal, single axis solar tracker assembly 100. The torque tube beam 250 is comprised of a number of connected torque tube beam segments, each of which is approximately 40 feet in length. In the schematic depiction of FIGS. 2-5, only a portion of the solar tracker assembly 100 and, thus, only a portion of the extent of the torque tube beam 250 and the frame 120 and a portion of the total number of bearing apparatuses of the plurality of bearing apparatuses 200 are shown. For example, in FIGS. 3 and 4, the first and second torque tube beam segments 260, 265 and portions of the third and fourth torque tube beam segments 270, 275 are schematically depicted.

Depending on the table configuration, the plurality of photovoltaic modules 190 may be in landscape or portrait orientation with respect to the torque tube beam 250. For example, in a so-called "one-in-portrait" photovoltaic module mounting configuration for the solar tracker assembly 102, a single row of photovoltaic modules overlie the torque tube beam 250 and extend outwardly in an east-west direction from the torque tube beam 250. If each of the photovoltaic modules of the plurality of photovoltaic modules 190 of the solar tracker assembly 102 includes a six foot long by three foot wide photovoltaic module which is mounted to the torque tube beam 250 by the frame 120, then approximately three feet of each photovoltaic module will extend outwardly on either side of a center of the torque tube beam 250, as the solar tracker assembly 102 is viewed in top plan view. To achieve a proper balance, the photovoltaic modules of the solar tracker assembly are positioned such that that a total weight of the frame 120, including the plurality of photovoltaic modules 190 and associated mounting components of the frame 120 (e.g., module rails, clamps, brackets and fasteners), are approximately equally distributed on either side of the torque tube beam 250, as viewed in top plan view. As viewed in top plan view, an extent of each photovoltaic module, as measured in an east-west direction, when the module 190a is horizontal, is referred to as a "chord" or "chord value", while a distance between adjacent solar tracker assemblies, for example, adjacent solar tracker assemblies 102, 104, as measured between center lines of the torque tube beam 250, is referred to as a "pitch" or "pitch distance". The ratio of chord to pitch is typically about 3:1 for a so-called "one-in-portrait" photovoltaic module mounting configuration. For example, if the photovoltaic modules each have a dimension of 6 feet by 3 feet, in a "one-in-portrait" photovoltaic module mounting configuration, each module is mounted to the torque tube beam 250 such that the 6 foot length of the photovoltaic module extends in the east-west direction and the three foot length extends along the torque tube beam in the north-south direction. In such a "one-in-portrait" configuration, the chord value CH is six feet, while the pitch distance P will be on the order of 18-20 feet. Accordingly, a distance D between facing edges 191, 192 of the photovoltaic modules 190 of solar tracker assemblies 102, 103 would be 12-14 feet. Of course, it should be appreciated that given that a torque tube beam segment is typically 40 feet in length and a typical photovoltaic module, such as the representative photovoltaic module 190a is approximately 3 feet by 6 feet and is mounted to the torque tube beam 250 in portrait orientation, many more photovoltaic modules would be present on any given torque tube beam segment than is schematically depicted in the FIGS. 1-4.

As noted above, in the solar tracker installation 1000, the first set of solar tracker assemblies 109a includes a number of parallel, spaced apart solar tracker assemblies or rows 102, 103, 104, 106, 107, 108, extend in a north—south direction so that the table 110 of each of the solar tracker assemblies can pivot to allow the plurality of photovoltaic modules of a solar tracker assembly to follow the path or arc of the sun as it moves across the sky during daylight hours to thereby maximize energy output during daylight hours. The torque tube beam 250 of a given solar tracker assembly, for example solar tracker assembly 102, defines a length or extent of the solar tracker assembly 102, extending in the north-south direction. Adjacent solar tracker assemblies on one or both sides of the solar tracker assembly 102 similarly extend in parallel, spaced apart configuration in a north-south orientation in the solar tracker installation, e.g., solar tracker assembly 103 is in parallel, spaced apart, aligned relationship with solar tracker assembly 102, while solar tracker assemblies 102, 104 are in parallel, spaced apart, aligned relationship with solar tracker assembly 103. As shown schematically in FIG. 1, the plurality of solar tracker assemblies 100 are located on a solar tracker installation site 1002 and are constructed or positioned on the site 1002 in one or more sets of parallel solar tracker assemblies 109a, 109b. Each set of solar tracker assemblies 109a, 109b includes a group of parallel, spaced apart solar tracker assemblies, for example, the set of solar tracker assemblies 109a includes representative rows of parallel, spaced apart solar tracker assemblies 102, 103, 104, 106, 107, 108. It should be understood, of course, that the number of solar tracker assemblies in the solar tracker assembly first set 109a and/or the solar tracker assembly second set 109b could include up to hundreds of parallel rows of solar tracker assemblies on the installation site 1002. The solar tracker assemblies of the set of solar tracker assemblies are oriented in a north-south direction so that a plurality of photovoltaic modules 190 of each of the solar tracker assemblies may be pivoted so as to track the sun as it moves from east to west across the sky. While the parallel solar tracker assemblies of the set of solar tracker assemblies 109 are uniformly spaced apart, the spacing between adjacent solar tracker assemblies (referred to as adjacent rows of solar tracker assemblies, for example, adjacent rows 102, 103) it is desired to minimize spacing so that the total number of solar tracker assemblies disposed on the installation site 1002 can be maximized to thereby maximize energy output from the solar tracker installation 1000

The plurality of bearing apparatuses 200 are positioned at spaced apart positions along the torque tube beam 250. Each bearing apparatus of the plurality of bearing apparatuses 200 includes the movable or rotatable bearing assembly 210 supporting the torque tube beam 250, a stationary saddle assembly 220, and a connecting assembly 230. The stationary saddle assembly constrains the pivoting or rotation of the rotatable bearing assembly 210 such that the bearing assembly 210 and the torque tube section extending through and supported by the rotatable bearing assembly 210 rotate about a bearing axis of rotation. The bearing axis of rotation defines a portion of the table axis of rotation R. The stationary saddle assembly 220 is mounted by the connecting assembly 230 to a support post 140, which is driven into the ground/substrate G or otherwise secured in the ground/substrate by, for example, concrete. Thus, the support post 140 and connecting assembly 230 determine the position and the vertical height of the rotatable bearing assembly 210 and, thereby, determine a height of the torque tube beam 250 with respect to the ground G. Each of the support posts 140 extend in the vertical direction V along a vertical center line or central vertical axis PCVA (FIG. 5) of the support post 140.

Each bearing apparatus of the plurality of bearing apparatuses 200, for example first and second bearing apparatuses 202, 204, includes the rotatable or rotating bearing assembly 210, the stationary saddle assembly 220 and the connecting assembly 230 (FIGS. 3 and 5). The torque tube beam 250 extends through and is supported by the rotatable bearing assembly 210 which rotates the torque tube beam 250 about the table axis of rotation R. The rotatable bearing assembly 210 of the bearing apparatus 200, in turn, is supported by the stationary saddle assembly 220. The stationary saddle assembly 220 constrains the pivoting or rotation of the rotatable bearing assembly 210 such that the bearing assembly and the torque tube section extending through and supported by the rotatable bearing assembly 210 rotate about a bearing axis of rotation. The table axis of rotation R (except in the region of the slew drive 160) is collectively defined by axes of rotation of the plurality of bearing apparatuses 200 positioned at spaced apart internals along the extent of the torque tube beam 250. Stated another way, each bearing axis of rotation of each bearing apparatus defines a portion of the overall table axis of rotation R. The individual axis of rotation of each of the plurality of solar tracker bearing apparatuses 200 are substantially aligned to or coincident to form a single or combined table axis of rotation R. As best seen in FIGS. 2 and 3, in the region of the slew drive 160, the table axis of rotation R is defined by: a) the axes of rotation of the first and second bearing apparatus 202, 204 of the plurality of bearing apparatuses 200; and b) the center of rotation of the rotating member 170 of the slew drive 160 and a pair of drive journals 300, namely, first and second drive journals 310, 350, which are affixed to opposite sides 172, 174 of the rotating member 170 and, in turn, receive end portions of the first and second torque tube beam segments 260, 265.

Additional details regarding the structure and function of a horizontal, single axis solar tracker assembly are disclosed in U.S. Pat. No. 10,944,354 to Ballentine et al., issued Mar. 9, 2021 ("the '354 patent"), and U.S. Pat. No. 11,271,518 to Ballentine et al., issued Mar. 8, 2022 ("the '518 patent"), both of which are assigned to the assignee of the present application. Both the '354 patent and the '518 patent are incorporated by reference herein in their respective entireties.

In one example embodiment, the housing 610 of the solar tracker controller 602, enclosing electronics 620 of the controller, is mounted to a lower wall 254 of the torque tube beam 250 of the solar tracker assembly 102 and the solar tracker controller 602 is powered by the dedicated photovoltaic module 647, which is also mounted to the torque tube beam 250. The dedicated photovoltaic module 647 is mounted to the torque tube beam 250 such that it is aligned with the plurality of photovoltaic modules 190 and pivots with the plurality of photovoltaic modules 190 through the table angle of inclination AI. As best seen in FIGS. 2-5, the representative solar tracker assembly 102 includes the drive mechanism 150 to rotate the table 110 of the solar tracker assembly 100 about a table axis of rotation R through the predetermined angle of inclination range AIR. The table 110 of the solar tracker assembly 102 includes the frame 120 supporting a plurality of photovoltaic modules 190, including, as schematically depicted in FIG. 2, representative photovoltaic modules 190a, 190b, 190c, 190d, 190e, 190f.

The rotatable torque tube beam 250 of the table 110, in turn, supports the frame 120. The plurality of bearing apparatuses 200, including representative bearing apparatuses 202, 204 (FIGS. 3 and 4), in turn, rotatably support the torque tube beam 250. The torque tube beam 250 is comprised of a plurality of aligned and couple torque tube beam segments. In FIGS. 3 and 4, portions of four torque tube beam segments, namely, first, second, third and fourth torque tube beam segments 260, 265, 270, 275 of the torque tube beam 250 are schematically depicted, it being understood that the solar tracker assembly 100 includes additional torque tube beam segments not shown. The plurality of bearing apparatuses 200 are advantageously configured and positioned such that, other than the first and second torque tube beam segments 260, 265 of the torque tube beam 250 adjacent the drive mechanism 150, the table axis of rotation R, is vertically aligned with, that is, would pass through or be acceptably close, for design purposes, to passing through a center of gravity or center of mass of the table 110.

Each of the solar tracker controllers of the plurality of solar tracker controllers 600 may be considered to be part of its associated solar tracker assembly of the plurality of solar tracker assemblies 100. For example, the solar tracker assembly 602 may be considered as a component of its associated solar tracker assembly 102. Additionally, each of the solar tracker controllers of the plurality of solar tracker controllers 600, for example, representative solar tracker controller 602, is also part of the solar tracker control and communications system 500. In FIG. 5, the angle of inclination range AIR of the table 110 of the solar tracker assembly 102 is schematically depicted, along with maximum positive and negative table angles of inclination AI+, AI−. In FIG. 5, a representative photovoltaic module 190a of the solar tracker assembly 102 is shown in dashed line with a neutral angle of inclination AIN, which means the photovoltaic module 190a (and therefore, the table 110 of the solar tracker assembly 102) is horizontal, facing directly upward, for example, when the sun is at its apex in the sky.

Backtracking Method 1100

The backtracking method 1100 of the present disclosure advantageously employs the backtracking algorithm or routine 1120. The backtracking algorithm 1120, in one exemplary embodiment, is a heuristic methodology which provides calculated backtracking angle of inclination values CAI (calculated angles of inclination or calculated angle of inclination values) for each of the solar tracker assemblies in the first set of solar tracker assemblies 109a for each daylight period for each day of the expected useful life of the solar tracker assemblies of the first set 109a. It should be understood, of course, the backtracking algorithm 1120 will similarly calculate backtracking angles of inclination CAI for all of the other sets of adjacent row solar tracker assemblies of the solar tracker installation 1000, for example, calculating backtracking angles of inclination CAI for the second set 109b of solar tracker assemblies 100 of the installation 1000. The calculated backtracking angle of inclination value CAI can be viewed as deviating from or modifying the angles of inclination or angle of inclination positions that would otherwise be used in a normal solar tracking mode of operation 1200. The calculated backtracking angle of inclination values CAI mitigate row-to-row shading of one or more of the plurality of photovoltaic modules 190 of a solar tracker assembly by the plurality of photovoltaic modules 190 of an adjacent solar tracker assembly within the first set of solar tracker assemblies 109a which would otherwise occur during early morning daylight hours and late evening daylight hours due to the sun's low position with respect to the horizon if table angle of inclination positions were set in accordance with the normal solar tracking mode 1200. Stated another way, the backtracking method 1100 provides calculated backtracking angles of inclination values CAI that modify or change the angles of inclination that would otherwise be as a result of the first set of solar tracker controllers 609*a* operating in the normal solar tracking mode 1200.

The backtracking algorithm 1100 calculates the calculated backtracking angle of inclination values CIA to mitigate row-to-row shading by the plurality of photovoltaic modules 190 of adjacent solar tracker modules of the first set of solar tracker assemblies 109*a* that would otherwise occur if the normal solar tracking mode of operation 1200 was used during post-sunrise and pre-sunset period. In one example or exemplary embodiment, the backtracking algorithm 1100 involves an iterative, heuristic procedure or set of calculations because the row-to-row shading problem must be considered along an entirety of the solar tracker assemblies of the first set of aligned solar tracker assemblies 109*a*. That is, if one angle of inclination of one solar tracker assembly in the first set 109*a* is changed from what would otherwise be the angle of inclination position used in the normal solar tracking mode 1200 to mitigate shading of the plurality of photovoltaic modules 190 of its neighboring adjacent solar tracker assembly, such a deviation or change of the table angle of inclination AI will necessarily have a ripple effect. That is, changing one angle of inclination may result in the changing of the angles of inclination of the two adjacent solar tracker assemblies on either side of the one solar tracker assembly and changing the angles of inclinations of the two adjacent solar tracker assemblies may result in changing the angles of inclination of the next two adjacent solar tracker assemblies and so on throughout the entirety of the first set of solar tracker assemblies 109*a*. Hence, the backtracking algorithm 110 may have to cycle through multiple iterations to arrive at a final set of calculated backtracking angle of inclination values CAI for each of the solar tracker assemblies of the first set of solar tracker assemblies 109*a* during morning and evening backtracking periods BTM, BTE over the expected life of the solar tracker assemblies of the first set of solar tracker assemblies 109*a*. The set of calculated backtracking angle of inclination values CAI is generated by the backtracking algorithm 1100 and are used by the first set of solar tracker controllers 609*a* to set table angles of inclination AI for their associate solar tracker assemblies of the first set of solar tracker assemblies 109*a*. A duration of time that the calculated set of values CAI are used by the first set of solar tracker controllers 609*a* to set table angles of inclination AI is what defines the backtracking period BT and, more specifically, the morning and evening backtracking periods BTM, BTE. Thus, the daylight time period for a given day may be viewed as commencing with a backtracking mode of operation 1110 just after sunrise SR wherein calculated backtracking angle of inclination values CIA are utilized by a solar tracker controller to set the table angles of inclination of its associated solar tracker assembly during a morning backtracking period BTM, then entering the normal solar tracking mode 1200 and setting the table angles of inclination utilizing angle of inclination positions utilizing appropriate sun position data for that day, and then, prior to sunset SS, the solar tracker controller reentering the backtracking mode 1110 and utilizing the calculated backtracking angle of inclination values CAI to set the table angles of inclination of its associated solar tracker assembly during an evening backtracking period BTE.

Figure 6:
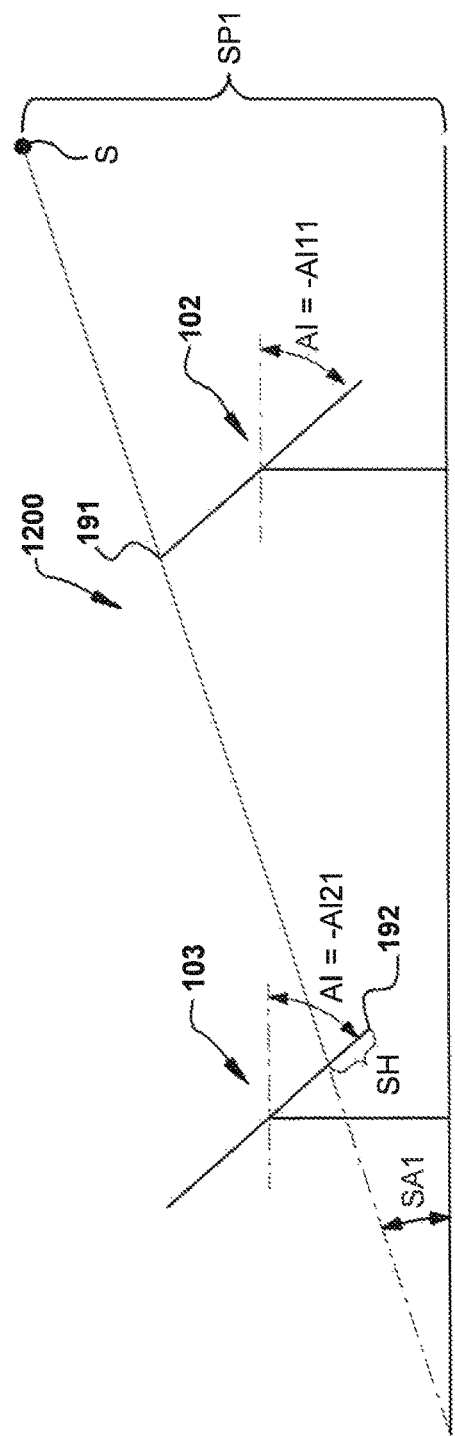
FIG. 6 is a schematic front elevation view of adjacent first and second east most solar tracker assemblies of a first set of solar tracker assemblies illustrating the row-to-row shading problem of a portion of a plurality of photovoltaic modules of the table of the second solar tracker assembly by a plurality of photovoltaic modules of the table of the first solar tracker assembly at a morning, easterly sun position wherein a backtracking method of the present disclosure is not utilized to modify an angle of inclination of the table of the first solar tracker assembly and instead the angle of inclination of the table is set in accordance with a normal tracking mode.
Figure 11:
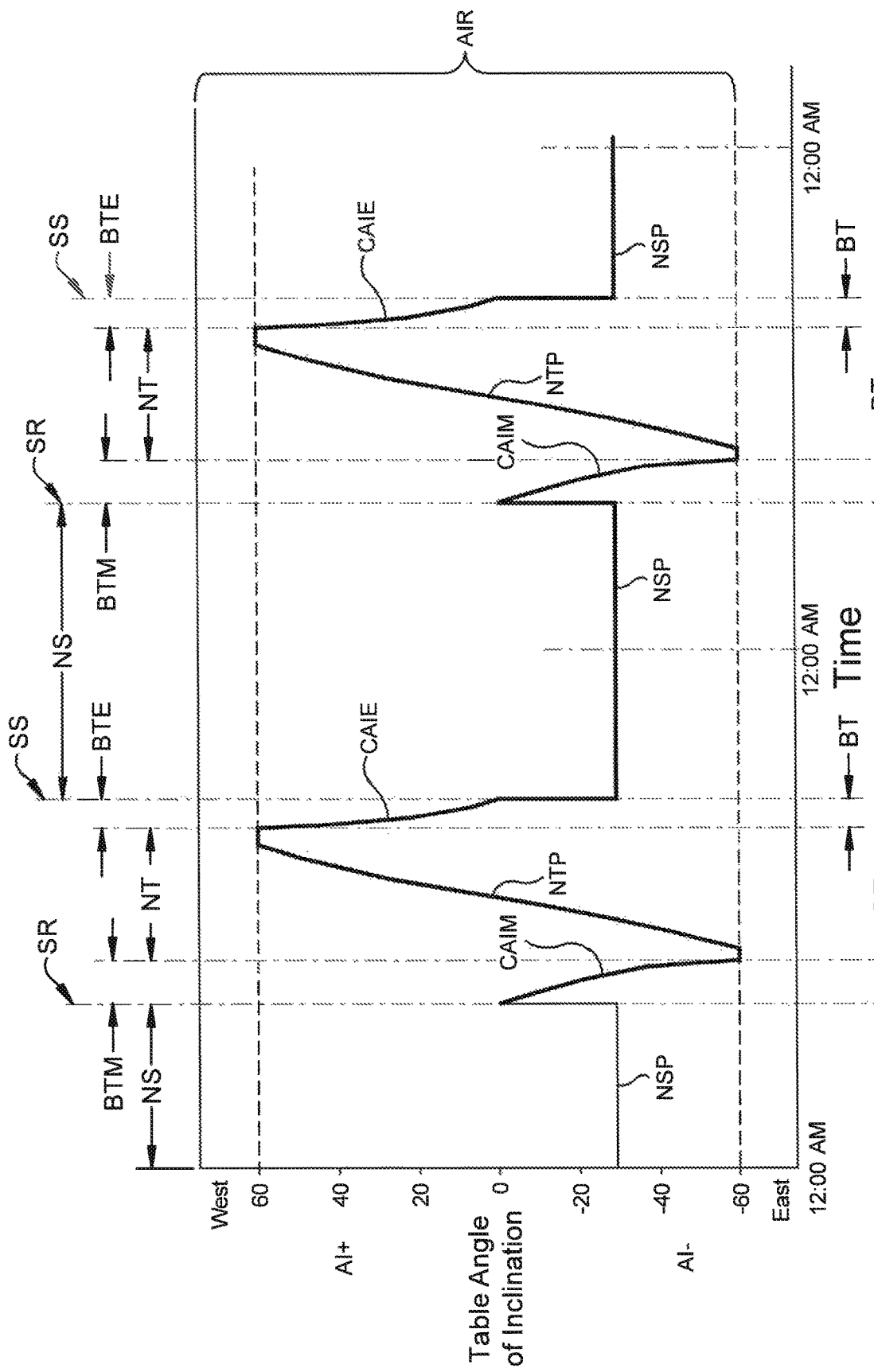
FIG. 11 is a simplified time chart plotting the angles of inclination of a table of an exemplary solar tracker assembly of the solar tracker installation over a two day period, the two day period including a normal tracking period, a morning backtracking period, an evening backtracking period, and a night stow period, during the morning and evening backtracking periods, the solar tracker controller operating in backtracking mode and setting the angles of inclination of the table in accordance with calculated table angle of inclination values, as determined by the backtracking algorithm of the backtracking method to mitigate row-to-row shading problems which would otherwise exist if table angles of inclination were set by the solar tracker controller to positions in accordance with the normal solar tracking mode.

The deviation of the calculated backtracking angle of inclination values CAI utilized in the backtracking mode 1120 from the angle of inclination positions that would otherwise be used in the normal tracking mode 1200 is schematically illustrated in the time chart presented in FIG. 11 which plots time vs. table angle of inclination AI, for a representative solar tracker assembly wherein the solar tracker assembly includes adjacent solar tracker assembly both to the east and the west of the solar tracker assembly, for example, in FIG. 1, the representative solar tracker assembly could be solar tracker assembly 103 of the first set of solar tracker assemblies 109*a*. Looking at FIG. 11, just after midnight (12:00 AM), the table angle of inclination AI of the representative solar tracker assembly 103 is in a night stow mode 1300 wherein the associated solar tracker controller 603 maintains the table 110 in a night stow position NSP of, in one example embodiment, AI=−30 degrees. At sunrise SR, the solar tracker controller 604 pivots the table 110 to the horizontal position AI=0 degrees. If the normal solar tracking mode 1200 were utilized, the solar tracker controller 603 would attempt, just after sunrise SR, to pivot the table 1110 to the maximum table angle of inclination in the easterly direction, namely, AI=−60 degrees to face, within the limits of the angle of inclination range AIR of the table 110, the rising easterly sun. However, such a maximum easterly angle of inclination of AI=−60 degrees would result in shading a lower portion of the plurality of photovoltaic panels 190 its adjacent western row solar tracker assembly, namely, solar tracker assembly 104 in FIG. 1. For example, for example, FIG. 6 schematically illustrates such an easterly row-to-row shading problem for the plurality of photovoltaic modules 190 of solar tracker assembly 103 by the plurality of photovoltaic modules 190 of its easterly adjacent solar tracker assemblies 102 of the first set of solar tracker assemblies 109*a* resulting in a shading region labeled SH in FIG. 6. Similarly, the same type of shading problem would occur for the plurality of photovoltaic modules 190 of solar tracker assembly 104 by the plurality of photovoltaic modules 190 of its easterly adjacent solar tracker assemblies 103.

The duration of the shading problem during the post-sunrise morning period would continue until the sun's position in the sky were high enough such that there was no longer any row-to-row shading of photovoltaic modules occurring between adjacent rows of the solar tracker assemblies of the first set of solar tracker assemblies 109*a*. At that time, the solar tracker controllers of the first set of solar tracker controllers 609*a* would switch from backtracking mode 1110 to normal solar tracking mode 1200 and the table angle of inclination positions would be set to AI=−60 degrees, as seen in FIG. 11. The duration of the morning backtracking period BTM, commencing at sunrise SR, is shown in FIG. 11, as is the evening backtracking period BTE, ending at sunset SS, is also shown in FIG. 11. The calculated backtracking table angle of inclination values for the morning backtracking period BTM, utilized by the solar tracker controller 603 to set the table angles of inclination for the solar tracker assembly 103 in the backtracking mode 1110 during the morning backtracking period BTM, are labeled as angle of inclination values CAIM in FIG. 11, while the calculated backtracking table angle of inclination values for the evening backtracking period BTE, utilized by the solar tracker controller 603 to set the table angles of inclination for the solar tracker assembly 103 in the backtracking mode 1110 during the evening backtracking period BTE, are labeled as calculated morning backtracking table angle of inclinations values CAIE in FIG. 11. The table angle of inclination positions, utilized by the solar tracker controller 603 to set the table angles of inclination for the solar tracker assembly 103 during daylight hours other than the backtracking period BT in the normal solar tracking mode 1200, are labeled as angle of inclination positions NTP in FIG. 11.

Stated another way, in the backtracking mode 1110, to mitigate potential row-to-row shading problem that would otherwise occur if the angle of inclination positions of the normal solar tracking mode 1200 were used, the solar tracker controller 603 uses the calculated backtracking angles of inclination values CAI to pivot the table 110 during the duration of the morning backtracking period BTM to follow or conform to the calculated backtracking angle of inclination values labeled as CAIM (morning backtracking table angle of inclination values) in FIG. 11. The morning backtracking table positions CAIM utilized during the morning backtracking period BTM may be viewed as a modification of or a deviation from the table positions that would otherwise be used during the normal tracking mode 1200. That is, as can be discerned from FIG. 11, during the morning backtracking period BTM, the table angle of inclination would be constant at AI=−60 degrees if the normal solar tracking mode were utilized by the solar tracker controller 603. The backtracking mode 1110 deviates from or modifies the table angle of inclination positions that would otherwise be used to track the sun's position in the normal solar tracking mode 1200. An objective of the backtracking mode 1110 is to mitigate row-to-row shading that would occur under the normal solar tracking mode 1200 during daylight hours immediately after sunrise.

As the sun's position moves toward sunset SS at the end of the daylight period, again the row-to-row shading problem arises, this time in a westerly direction. That is, utilizing the normal solar tracking mode 1200, as is depicted in FIG. 11, the solar tracker controller 603 has pivoted the table 110 of the solar tracker assembly 103 to the maximum table angle of inclination in the westerly direction, namely, AI=+60 degrees to face, within the angle of inclination range AIR of the table 110, the westerly setting sun. However, such a maximum westerly angle of inclination of AI=+60 degree would have the tendency to shade a lower portion of the plurality of photovoltaic panels 190 its adjacent eastern row solar tracker assembly, namely, solar tracker assembly 102 (see, for example, FIG. 8 which illustrates the westerly row-to-row shading problem for adjacent solar tracker assemblies 107, 108 of the first set of solar tracker assemblies 109*a*).

To mitigate this potential row-to-row shading problem that would otherwise occur if the angles of inclination of the normal solar tracking mode 1200 were used, the solar tracker controller 603 instead uses the calculated backtracking angle of inclination values CAI to pivot the table 110 during the evening backtracking period BTE to follow or conform to the calculated backtracking table angle of inclination values labeled as CAIE (evening backtracking table angle of inclination values) in FIG. 11. At sunset SS, the evening backtracking period BTE terminates and the solar tracker controller 603 modes to the night stow mode 1300 and the table angle of inclination is again set to the night stow position NSP, that is, AI=−30 degrees. The evening backtracking table angle of inclination values CAIE utilized during the evening backtracking period BTE may be viewed as a modification of or a deviation from the table positions that would otherwise be used during the normal tracking mode 1200. That is, as can be discerned from FIG. 11, during the evening backtracking period BTE, the table angle of inclination would be AI=+60 degrees if the normal solar tracking mode were utilized by the solar tracker controller 603. The backtracking mode 1110 deviates from or modifies the table angle of inclination positions that would otherwise be used to track the sun's position in the normal solar tracking mode 1200. An objective of the backtracking mode 1110 is to mitigate row-to-row shading that would occur under the normal solar tracking mode 1200 during daylight hours just prior to sunset.

Figure 8:
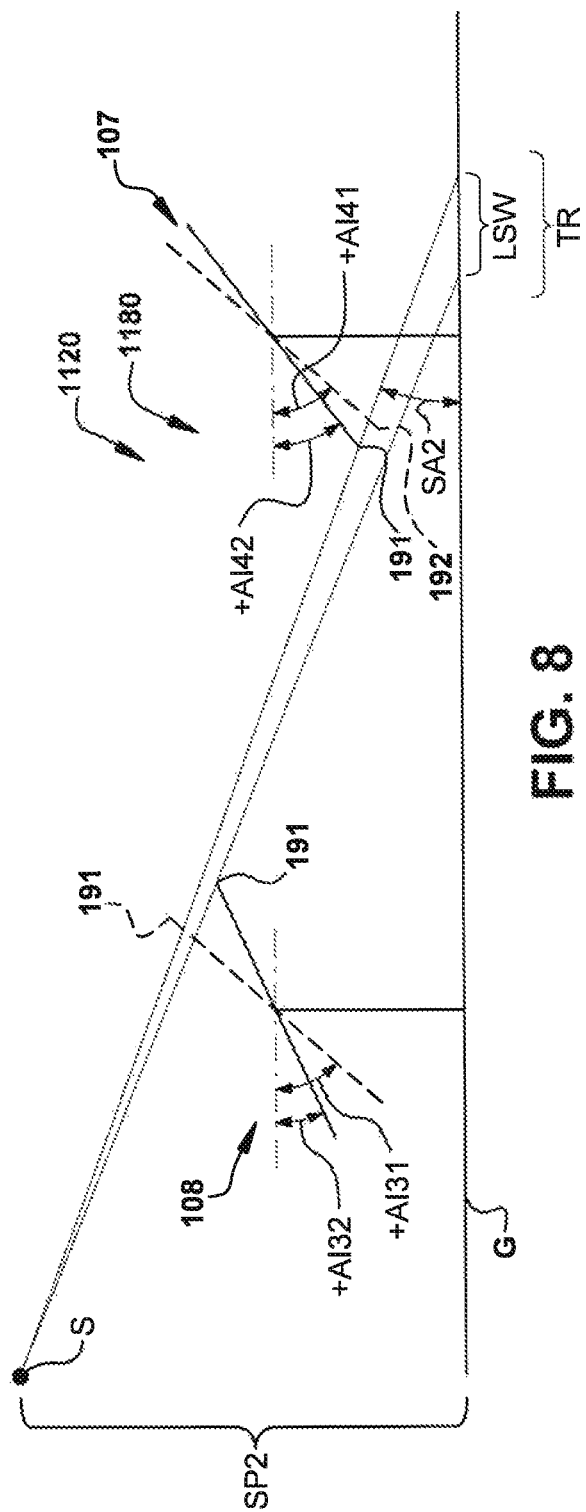
FIG. 8 is a schematic front elevation view of adjacent first and second west most solar tracker assemblies of the first set of solar tracker assemblies wherein row-to-row shading of the plurality of photovoltaic modules of the table of the second solar tracker assembly by the plurality of photovoltaic modules of the table of the first solar tracker assembly is mitigated during an evening backtracking period by setting the respective angles of inclination of the tables of the first and second western most solar tracker assemblies in accordance with calculated angle of inclination values utilizing the backtracking algorithm of the backtracking method of the present disclosure, for sun position SP2, the calculated angles of inclination resulting in the late evening sun's rays passing between facing edges of the plurality of photovoltaic modules of the table of the first solar tracker assembly and the plurality of photovoltaic modules of the table of the second solar tracker assembly such that a light stripe having width within a target range light stripe width would be cast upon the ground.

During the normal solar tracking period NT, the solar tracker controller 603 utilizes table angle of inclination positions that track the sun's position, within the limits of the table angle of inclination range AIR. As can be seen in FIG. 11, the normal tracking position NTP moves gradually during daylight hours from AI=−60 degrees in the morning to AI=+60 degrees in the evening. Given certain input data regarding the position and spacing of the solar tracker assemblies of the first set of solar tracker assemblies 109, a sun position table which provides the position of the sun as measured along an east—west direction at the solar tracker installation site 1002, and the table angle of inclination range AIR, the backtracking method is applied to calculate backtracking angle of inclination value CAI for each of the solar tracker assemblies in the first set of solar tracker assemblies 109*a* such that the row-to-row shading between adjacent solar tracker assemblies of the first set of solar tracker assemblies 109*a*. In one respect backtracking may be viewed as a backtracking mode of operation 1110 by the solar tracker controllers of the first set of solar tracker controllers 609*a*. That is, during daylight hours, for a given time t, if there is a calculated backtracking angle of inclination values CAI, the solar tracker controllers of first set of solar tracker controllers 609*a* will operate in backtracking mode 1110 and will set the table angles of inclination AI of their associated solar tracker assemblies of the first set of solar tracker assemblies 109*a* in accordance with the backtracking angle of inclination value CAI for that time t, as opposed to using the angle of inclination positions provided by or conforming to the normal solar tracking mode 1200. When the first set of solar tracker controllers 609*a* are utilizing the backtracking angle of inclination values CAI, as opposed to using the angles of inclination that would otherwise be used under the normal solar tracking mode 1200 during specific post-sunrise and pre-sunset daylight hours, this is referred to herein as operating in the backtracking mode 1110. The period of time during which the backtracking mode 1110 is utilized by the first set of solar tracker controllers 609*a* is referred to as a backtracking period BT, as opposed to a normal solar tracking period NT. The backtracking period BT includes an early morning backtracking period BTM, just after sunrise, and also includes a late evening backtracking periods BTE, just before sunset. During the morning backtracking period BTM, potential row-to-row shading occurs because of the sun's low position in the eastern sky, for example, sun position SP1, as schematically illustrated in FIG. 6, while during the evening backtracking period BTE, potential row-to-row shading occurs because of the sun's low position in the western sky, for example, sun position SP2, as schematically illustrated in FIG. 8.

The backtracking period BT, including the morning and evening backtracking periods BTM, BTE can be understood as follows. Ideally, during daylight period, the angle of inclination of the tables 110 of the respective solar tracker assemblies of the first set of solar tracker assemblies 109*a* is set in accordance with the normal sun tracking mode or routine 1200, that is, in general terms, during daylight hours, the normal sun tracking mode 1200 would calculation the angles of inclination such that the tables 110 point toward the sun's position in the sky, as viewed along an east-west axis. Looking at, for example, FIGS. 6-8, the sun position is SP1 in FIGS. 6 and 7, and is SP2 in FIG. 8. The angular position of the sun is labeled SA1 in FIGS. 6 and 7 and is labeled SA2 in FIG. 8. In the normal tracking mode 1200, a sun position algorithm is used, along with coordinates of longitude and latitude of the solar tracker installation site 1002. The result of the sun position algorithm is that a sun position table is generated for which corresponds sun position angle values for each date/time period for an extended time period (e.g., 20-30 years or more). In the normal tracking mode 1200, the solar tracker controllers, for example, solar tracker controller 602 directs the drive mechanism 150 to aim the table 110, that is, aim the plurality of photovoltaic modules 190 at the sun, within, of course, the angle of inclination range AIR of the table 110. During the backtracking period BT, if the normal sun tracking mode 1200 were used to set the table angles of inclination, undesirable row-to-row shading between adjacent solar tracker assemblies would occur. Thus, in one sense, the backtracking period BT can be defined as a period during which, if the normal sun tracking mode 1200 were utilized undesirable row-to-row shading would occur. The morning backtracking period BTM is a morning post-sunrise portion of the backtracking period BT, in which, if the normal sun tracking mode 1200 were utilized, undesirable row-to-row shading would occur as a result of the sun's position in the eastern sky (FIGS. 6 and 7), while the evening backtracking period BTE is an evening pre-sunset portion of the backtracking period BT, in which, if the normal sun tracking mode 1200 were utilized, undesirable row-to-row shading would occur as a result of the sun's position in the western sky (FIG. 8). Thus, in one sense, the backtracking calculated angle of inclination values CAI resulting from the backtracking method 1100 and utilized in the backtracking mode 1110 can be viewed as a deviation from the angles of inclination positions used in the normal tracking mode 1200. The backtracking calculated angles of inclination values CAI of the backtracking mode 1110 may be viewed as deviations or deltas from the angle of inclination positions of the normal tracking mode 1200 during a portion of daylight hours referred to as the backtracking period or equally well the calculated angle of inclination values CAI of the backtracking mode 1110 may be viewed as angles of inclination used during a portion of the daylight hours referred to the backtracking period. In either case, the calculated backtracking angle of inclination value CAI, as utilized by the first set of solar tracker controllers 609a to set table angles of inclination for the first set of solar tracker assemblies 109a mitigate undesirable row-to-row shading that would otherwise occur between adjacent solar tracker assemblies of the set of solar tracker assemblies 109a during the morning and evening backtracking periods BTM, BTE of the daylight hours.

In the normal tracking mode 1200, a solar tracker controller, for example, solar tracker controller 602 associated with the solar tracker assembly 102, utilizing a sun position table, directs the drive mechanism 150 of its associated solar tracker assembly 102 to pivot the table of the solar tracker assembly 102 to, within the constraints of the angle of inclination range AIR of the table 110, point the upper surfaces of the photovoltaic modules 190 of the table 110 at the sun S as the sun moves across the sky from sunrise to sunset. That is, the upper surfaces of the photovoltaic modules are normal or orthogonal to the sun as the sun moves across the sky. Instead, during the backtracking period BT, specifically, in the backtracking mode 1110, the solar tracker controller 602 deviates from the calculated angle of inclination of the normal tracking mode 1200 and instead utilizes the calculated backtracking table angle of inclination positions or values CAI and commands the drive mechanism 150 to pivot the table angle of inclination AI in accordance with the calculated table angle of inclination values CAI during the backtracking period BT. As noted above, in one example embodiment, the backtracking algorithm 1100 used to calculate the backtracking table angle of inclination values CAI may be executed by the array controller 510 or by the solar tracker controller 602 and the values CAI communicated to each of the controllers of the set of solar tracker controllers 609a of the set of solar tracker assemblies 109a. Alternately, the calculated backtracking table angle of inclination values CAI, in another example embodiment, may be executed by each of the set of solar tracker controllers 609a of the set of solar tracker assemblies 109a and the values CAI used directly by each controller to control its respective table angle of inclination AI. As explained above, in one sense, the calculated angle of inclination values CAI utilized by the solar tracker controller in the backtracking mode 1110 during the backtracking period BT can be viewed as a deviation or modification of the table angle of inclination values AI that would otherwise be utilizing by the solar tracker controller 602 during normal tracking mode 1200 to mitigate shading problems between adjacent solar tracker assemblies.

Again, for brevity, discussion will be with respect calculating angles of inclination AI during a backtracking period BT for tables 110 of selected solar tracker assemblies of the first set of solar tracker assemblies 109a, with the understanding that the discussion similarly applies to calculation of angles of inclination AI during the backtracking period BT for the tables 110 of the remaining solar tracker assemblies of the first set of solar tracker assemblies 109a, as well as the solar tracker assemblies of other sets of solar tracker assemblies of the solar tracker installation 1000, including the second set of solar tracker assemblies 109b of the solar tracker installation 1000. In one exemplary embodiment, the backtracker period BT includes the morning backtracker period BTM, subsequent to sunrise, and the evening backtracking period BTE, subsequent to sunset. Advantageously, in accord with the backtracking method 1100, in one exemplary embodiment, the array controller 510 executes the backtracking algorithm 1120 and calculates table angles of inclination CAI for each solar tracker assembly of the set of solar tracker assemblies 109a for the morning and evening backtracking periods BTM, BTE based on data including: a) sun position data provided by a sun position table accessible to the array controller 510; b) pitch data P for each of the solar tracker assemblies of the set of solar tracker assemblies 109a, the pitch being the distance between torque tube beams 250 of adjacent solar tracker assemblies or rows of the first set of solar tracker assemblies 109a; c) chord data CH corresponding to a width of each table 110 of the set of solar tracker assemblies 109a; and d) vertical height data HT corresponding to a vertical height of a torque tube beam 250 above the ground G for each table 110 of the set of solar tracker assemblies 109a. Utilizing the backtracking method 1120, in one example embodiment, the array controller 520 generates calculated table angles of inclination CAI for each of the set of solar tracker assemblies 109a during the morning and evening backtracking periods BTM, BTE. The calculated table angle of inclination values CAI, for example, the calculated table angles of inclination CAI for the solar tracker assembly 102 are transmitted by the array controller 510 to the associated solar tracker controller 602. The solar tracker controller 602 then utilizes the calculated table angles of inclination values CAI to control angles of inclination AI of respective tables 110 of the set of solar tracker assemblies 109a. The calculated table angle of inclination values CAI generated by the array controller 510 utilizing the backtracking algorithm 1120 are utilized by the plurality of solar tracker controllers 609a to control the table angles of inclination AI of the set of solar tracker assemblies 109a to advantageously mitigate row-to-row shading of photovoltaic modules of one row or solar tracker assembly by the photovoltaic modules of an adjacent row or adjacent solar tracker assembly that otherwise would occur during morning and evening backtracking periods BTM, BTE if the normal sun tracking mode 1200 were employed by the plurality of solar tracker controllers 609a to control angles of inclination AI of the respective tables 110 of the set of solar tracker assemblies 109a.

The backtracking method 1100 of the present disclosure also includes the method of imaging 1400 each of the plurality of solar tracker assemblies 100 of the installation to image and accurately determine three dimensional coordinates or three dimensional coordinate values 410 of one or more selected elements or features 400 of a solar tracker assembly, for example, solar tracker assembly 102. The terms three dimension coordinates, three dimension coordinate values, three dimensional coordinates, three dimensional coordinate values, coordinates, and coordinate values as used herein will be understood to be interchangeable and will be associated with reference number 400. A flow chart depicting selected steps of the method of imaging 1400 is set forth in FIG. 15, while a flow chart depicting selected steps of the method of imaging 1400, as applied to an example embodiment wherein two selected elements 400 (namely, endcaps 290, 292) of the solar tracker assembly 102 is shown as method of imaging 1420 in FIG. 14. The coordinate values 410 in the method of imaging 1420 are three dimensional coordinate values 280a, 282a. The accurate three dimension coordinate values 400 resulting from the method of imaging 1400 are input to the backtracking algorithm 1120 and permit the algorithm to account for vertical or height differences between the tables of adjacent solar tracker assemblies (for example, solar tracker assemblies 102, 103 depicted in FIGS. 6 & 7) which may occur due to undulations of the ground level G over an extent of an installation site 1002 of the solar tracker installation 1000. The imaging of the solar tracker assemblies 100 of the installation 1000 facilitates the determination of accurate three dimensional coordinate values 410 associated with one or more elements or features 400 of each solar tracker assembly of the plurality of solar tracker assemblies 100 such that when the three dimensional coordinate values 410 corresponding to the selected elements are input to the backtracking algorithm 1120, the calculated angles of inclination CAI are more accurate and valid than would otherwise be the case if: a) estimated coordinate values were input to the backtracking algorithm 1120; or b) if the backtracking algorithm calculations were made with the simplifying assumption that all tables of the plurality of solar tracker assemblies 100 were at the same vertical height.

Figure 14:
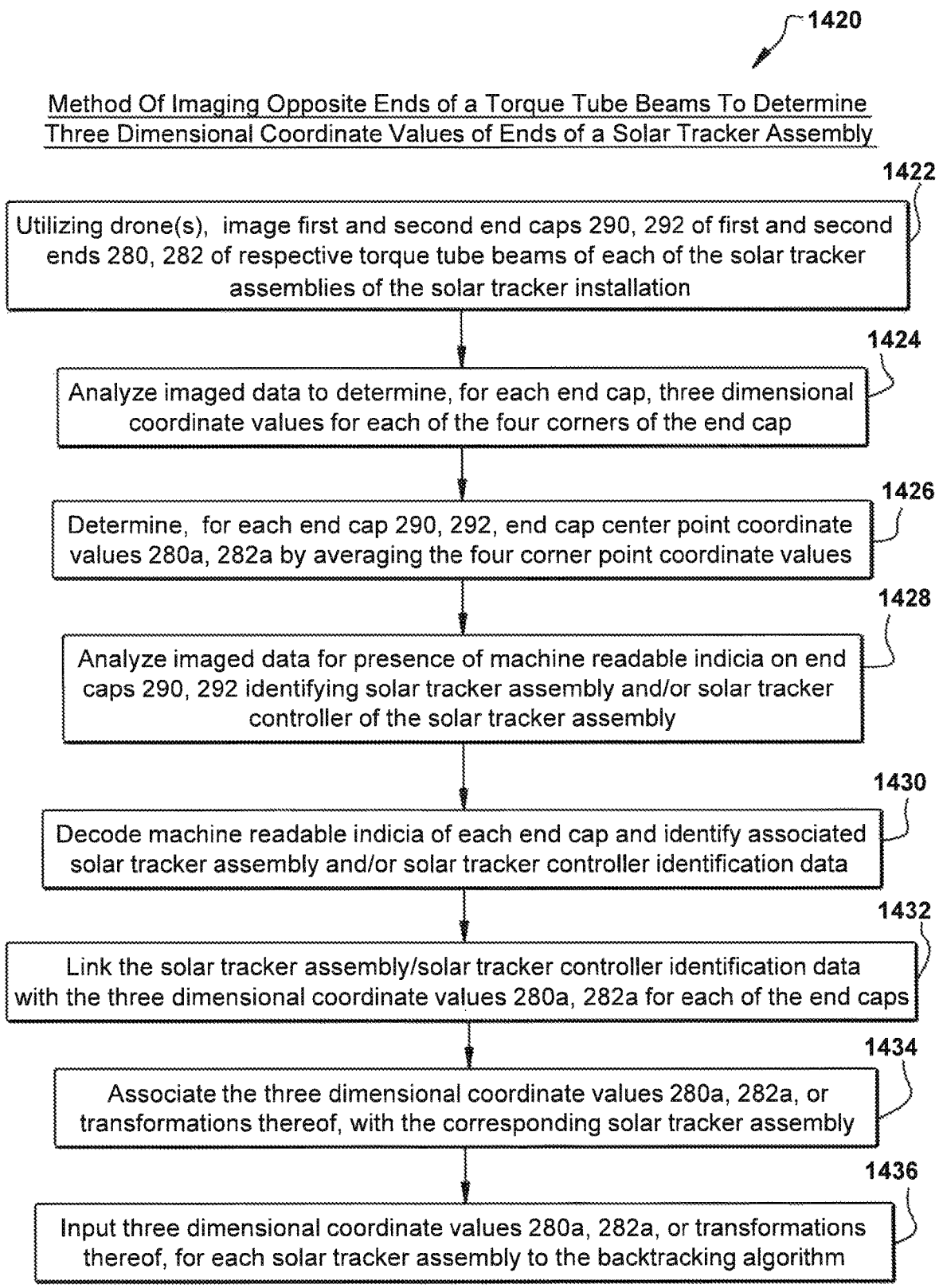
FIG. 14 is a simplified flow chart of a specific example embodiment of the imaging method of FIG. 15 wherein end caps of end portions of a torque tube beam of a solar tracker assembly are imaged, identified in one or more image frames, and have three dimensional coordinates determined for each end cap for use in connection with the backtracking method of the present disclosure.
Figure 15:
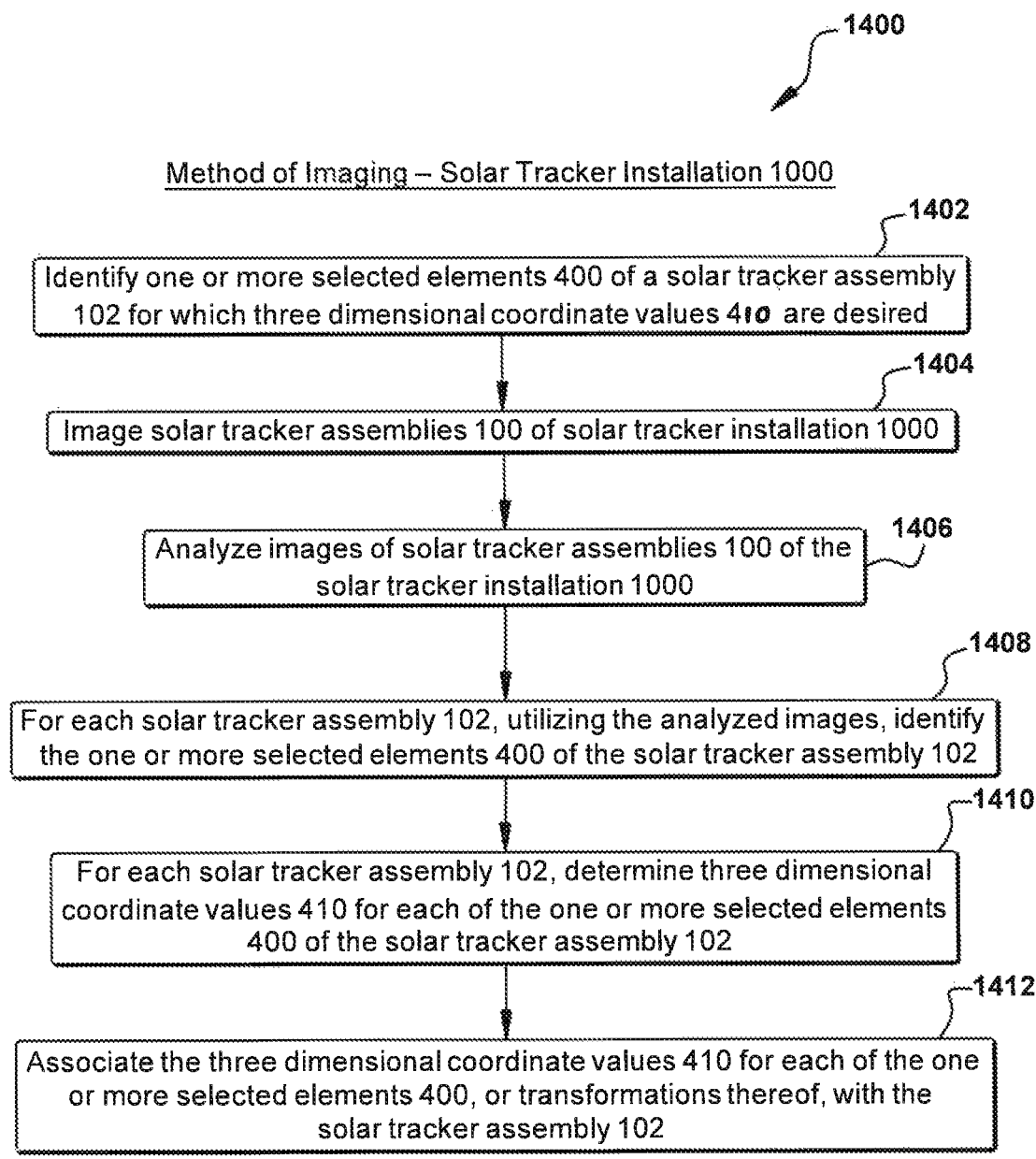
FIG. 15 is a simplified flow chart of an imaging method of the present disclosure for use in conjunction with or as part of the backtracking method of the present disclosure.

In one exemplary or example embodiment, the method of imaging 1400 utilizes a drone DR (schematically depicted in FIGS. 1 and 9) having an imaging system 1450 to image one or more elements or features of interest or selected elements 400 of each solar tracker assembly of the plurality of solar tracker assemblies 100. The purpose of imaging the one or more selected elements 400 for a given solar tracker assembly, for example, solar tracker assembly 102 of the set of solar tracker assemblies 109a of the plurality of solar tracker assemblies 100, is to accurately obtain three dimensional coordinates 410 for each of the one or more selected elements 400 of the solar tracker assembly 102. The calculated three dimensional coordinates 410 associated with the solar tracker assembly 102 are input to the backtracking algorithm 1120 and utilized by the backtracking algorithm 1120 to determine table angles of inclination AI of the set of solar tracker assemblies 109a to advantageously mitigate row-to-row shading of photovoltaic modules of one row or solar tracker assembly by the photovoltaic modules of an adjacent row or adjacent solar tracker assembly that otherwise would occur during morning and evening backtracking periods BTM, BTE for the backtracking periods. A simplified flow chart generally illustrating selected steps of the method of imaging 1400 is depicted in FIG. 15, while a more specific flow chart illustrated one example embodiment of the method of imaging 1400 is depicted in FIG. 14 wherein the one or more selected elements 400 are first and second end caps 282a, 282b overlying the first and second ends 280, 282 of torque tube beams 250 of the tables 150 of each of the solar tracker assemblies of the plurality of solar tracker assemblies 100. The method of imaging 1400 also utilizes imaging software 1401 (schematically depicted in FIG. 1) to analyze the imaged data or image data (images or image frames), identify within the images the selected elements 400, e.g., the end caps 290, 292 of the first and second ends 280, 282 of the torque tube beam 250, and determine three dimensional coordinate values 410 for each element 400, for example, a three dimensional coordinate value 280a associated with and corresponding to the first end cap 290 and a three dimensional coordinate value 282a associated with and corresponding to the second end cap 292 of the torque tube beam 250 of the table 200 of the solar tracker assembly 102.

Figure 9:
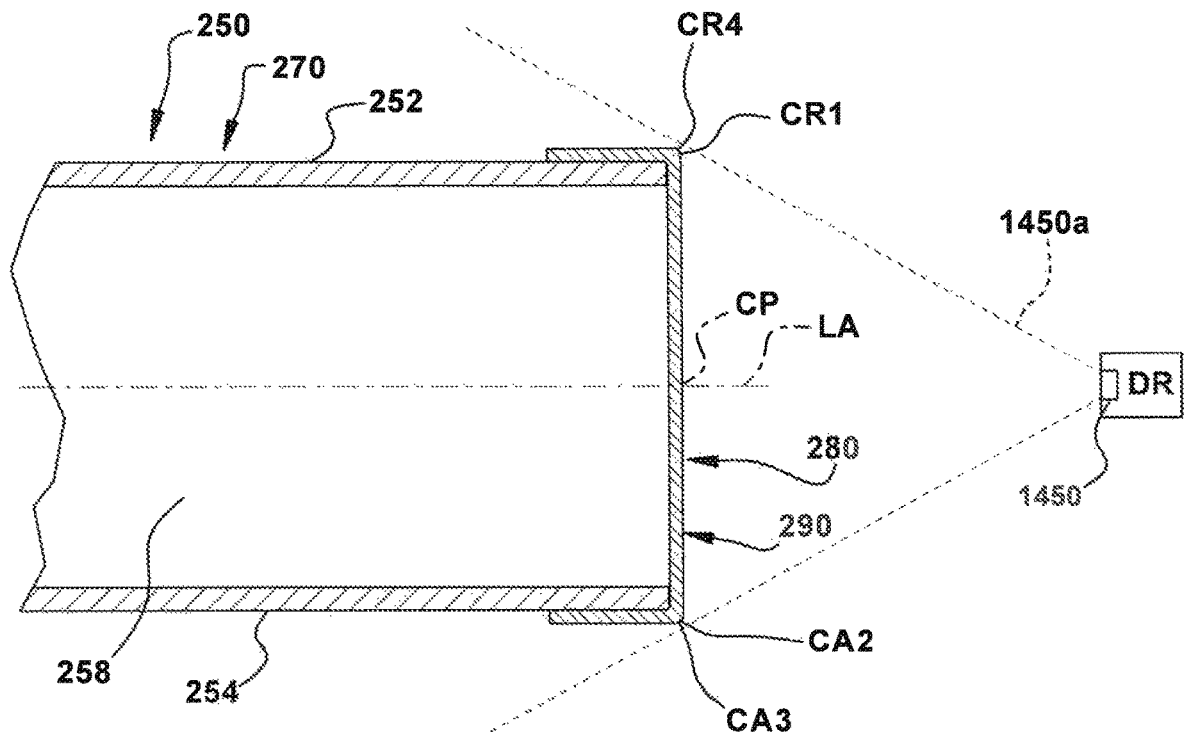
FIG. 9 is a schematic vertical section view of an end of a torque tube beam of the solar tracker assembly of FIG. 2, the end of the torque tube beam including an end cap.

The imaging system 1450 of the drone DR is characterized by the field of view 1450a, schematically depicted in FIGS. 1 and 9. As the drone DR flies or hovers over the solar tracker installation site 1002, the imaging system 1450 takes many images or image frames of the plurality of solar tracker assemblies 100 of the solar tracker installation 1000. The imaging software associated with the imaging system 1450 performs the following functions: a) analyzing the images or image frames generated by the imaging system 1450; b) identifying the one or more selected elements or features 400 of each solar tracker assembly, for example, identifying first and second ends or end portions 280, 282 of the torque tube 250 of each solar tracker assembly of the installation 1000, for example, solar tracker assembly 102, of the plurality of solar tracker assemblies 100; and c) determining the three dimensional coordinates or three dimensional coordinate values 410 corresponding to the location of the selected elements or features of each of the plurality of solar tracker assemblies 100 of the installation 1000, for example, the three dimensional coordinate values 280a, 282a of the first and second ends 280, 282 of the torque tube beam 250 of the solar tracker assembly 102. In the foregoing example embodiment, obtaining coordinates of the torque tube beam ends 280, 282 for the table 120 of a solar tracker assembly allows an accurate estimate of the coordinates of a middle portion of the torque tube beam because, generally, the respective torque tube beams of each of the solar tracker assemblies are constructed such that the torque tube beams are linear or straight from one end 280 of the torque tube beam 250 to the other end 282 of the beam 250. Thus, the coordinates of the ends 280, 282 of the torque tube beam 250 allow the backtracking algorithm 1120 to optimize backtracking, that is, calculating table angle of inclination values CAI such that row-to-row shading of photovoltaic modules of a solar tracker assembly by adjacent row solar tracker assemblies, in the east and west directions, of the solar tracker assembly, is minimized during morning and evening backtracking periods BTM, BTE.

As previously discussed, it is assumed that the plurality of solar tracker assemblies 100 of the solar tracker installation 1000 are arranged in one or more sets of parallel, aligned, spaced apart solar tracker assemblies on an installation site 1102. For example, FIG. 1 schematically illustrates two such sets of solar tracker assemblies, namely, sets of solar tracker assemblies 109*a*, 109*b* located on the installation site 1002. As schematically depicted in FIG. 1, the first set of solar tracker assemblies 109*a* includes from east to west, rows of solar tracker assemblies 102, 103, 104, 106, 107, 108 (recognizing, of course, that in an actual solar tracker installation, the number of rows, that is, the number of parallel, spaced apart solar tracker assemblies comprising the first set 109*a* would typically include more than six rows of solar tracker assemblies and, defending on the size of the installation site 1002, could include up to hundreds of rows of spaced apart, parallel, aligned rows of solar tracker assemblies). The presence of additional rows of solar tracker assemblies between solar tracker assembly row 104 and solar tracker assembly row 106 is represented schematically by the ellipsis or three dots in FIG. 1. Each solar tracker assembly row 102, 103, 104, 106, 107, 108 of the solar tracker assembly set 109*a* is oriented such that a pivoting table 150 of the solar tracker assembly, including the longitudinally extending torque tube beam 250 of the table 150, is oriented in a north-south direction such that a plurality of photovoltaic modules 190 supported by the torque tube beam 250 may be pivoted through an angle of inclination range AIR of the table 150 thereby allowing the upper surfaces of the plurality of photovoltaic modules 190 to track the sun S as it moves across the sky from east to west. In the schematic depiction of FIG. 1, solar tracker assemblies 102, 103 are adjacent and represent the two most easterly rows of solar tracker assemblies of the set 109*a*, while solar tracker assemblies 108, 107 are adjacent and represent the two most westerly rows of solar tracker assemblies of the set 109*a*. The rows of the solar tracker assembly set 109*a* are generally adjacent, aligned, parallel, and uniformly spaced apart, within the installation tolerances and variations to be expected, of course, when installing solar tracker assemblies, which may be 400 feet long, at a remote installation site 1002. Additionally, because of undulations of the ground G over an extent of the installation site 1002, there may be vertical differences in height of the torque tube beams 250 of the set 109*a*. For each adjacent pair of solar tracker assembly rows, for example, easternmost adjacent rows 102, 103, of the solar tracker assembly set 109*a*, the solar tracker assembly rows 102, 104 are generally parallel, aligned, and uniformly spaced apart, as viewed in the top plan view of FIG. 1.

When the tables 150 of the solar tracker assembly rows 102, 104 are in a neutral angle of inclination AIN, i.e., the plurality of photovoltaic modules 190 of each of the rows 102, 104 are horizontal, the adjacent pair of solar tracker assemblies 102, 103 are characterized by the following values schematically depicted in FIG. 1: a) a chord or width of table value CH (as measured in the east-west or Y direction and in top plan view of FIG. 1), which is the same for both assemblies 102, 103; b) a pitch distance P between center lines or longitudinal axes LA of the solar tracker assembly rows 102, 103 (as measured in the east-west or Y direction and in top plan view); and c) horizontal edge distance D between facing edges 191, 192 of a set of photovoltaic modules 190 of the solar tracker assembly 102 and a set of photovoltaic modules 190 of the solar tracker assembly 103 (as measured in the east-west or Y direction and in top plan view).

During the backtracking period BT, the calculated angle of inclination values CAI for the respective tables 150 of each of the solar tracker assemblies of the set of solar tracker assemblies 109*a* are utilized by associated solar tracker controllers of the set of solar tracker controllers 609*a*, via the associated drive mechanism 150 of the associated solar tracker assembly, to control the angles of inclination AI of the respective tables of the plurality of solar tracker assemblies 100 of the installation 1000. The backtracking method 1100 advantageously seeks to mitigate undesirable shading of photovoltaic modules of a solar tracker assembly by adjacent row solar tracker assemblies during morning and evening backtracking periods that would otherwise occur if the table angles of inclination were determined in accordance with the normal tracking mode 1200. In the normal tracking mode 1200, the table angles of inclination AI of each of the plurality of solar tracker assemblies 100 are periodically pivoted or moved, within a range AIR of the table angles of inclination AI, so that the upper surfaces of the plurality of photovoltaic modules 190 track the position of the sun S as the sun S moves across the sky from east to west during daylight hours. For example, in the normal tracking mode 1200, the table 110 of the first solar tracker assembly 102, is periodically pivoted by its associated controller 602, utilizing the tracker's drive assembly 150, during daylight hours such that the upper surfaces of the plurality of photovoltaic modules 190 of the first solar tracker assembly 102 is perpendicular or orthogonal to the position of the sun S, as the sun moves across the sky (as viewed in a two dimensional front elevation view, as shown, for example, in FIGS. 6-8), and within, of course, the angle of inclination range AIR of the table 110. Similarly, in the normal tracking mode 1200, the adjacent row solar tracker assembly, namely, solar tracker assembly 103 is pivoted by its associated controller 604, utilizing the tracker's drive assembly 150, during daylight hours such that the upper surfaces of the plurality of photovoltaic modules 190 of the second solar tracker assembly 102 is perpendicular or orthogonal to the position of the sun S, as the sun moves across the sky (again, as viewed in a two dimensional front elevation view, as shown, for example, in FIGS. 6-8), and within, of course, the angle of inclination range AIR of the table 110.

By way of example, FIG. 6 diagrammatically depicts an example of a potential shading problem between solar tracker assemblies 102, 103, in normal tracking mode 1200 at an early morning time when the sun's position SP1 is relatively low above the horizon in the east, that is, the sun's angle with respect to the horizon is SAl. In the normal tracking mode 1200, a sun position table is used by the respective solar tracker controllers 602, 603 to determine table angles of inclination. In the normal tracking mode 1200, the table 110 of the most eastern most solar tracker assembly 102 is pivoted by the associated solar tracker controller 602, utilizing the drive mechanism of the solar tracker assembly 102, to a table angle of inclination AI=AI11 in accord with the calculations of the controller 602 utilizing the sun position table. The table 110 of the adjacent second eastern most solar tracking assembly 103 is pivoted by the associated solar tracker controller 603, utilizing the drive mechanism 150 of the solar tracker assembly 103, to a table angle of inclination AI=AI21, in accord with the calculations of the controller 603 utilizing the sun position table. However, as is diagrammatically depicted in FIG. 6, with the sun position at SP1 above the horizon or ground G, if the tables 110 of the first and second row solar tracker assemblies 102, 104 are at angles of inclination AI11, AI21 wherein the plurality of photovoltaic modules 190 of the table 110 of the first solar tracker assembly 102 cast a shadow or shade on a portion of one or more of the plurality of photovoltaic modules 190 of the adjacent row solar tracker assembly 103 (schematically depicted as shaded portion SH in FIG. 6). This will be referred to herein as "row-to-row shading", that is, the photovoltaic modules of the table of one solar tracker assembly shade at least some portion of the photovoltaic modules of the table of an adjacent solar tracker assembly in a set of adjacent, aligned, spaced apart solar tracker assemblies. Since the photovoltaic modules of the plurality of photovoltaic modules 190 of the second solar tracker assembly 103 are electrically connected in series, shading even a portion of one of the photovoltaic modules of the plurality of photovoltaic modules 190 will result in a significant decrease in energy output by the solar tracker assembly 103.

Figure 7:
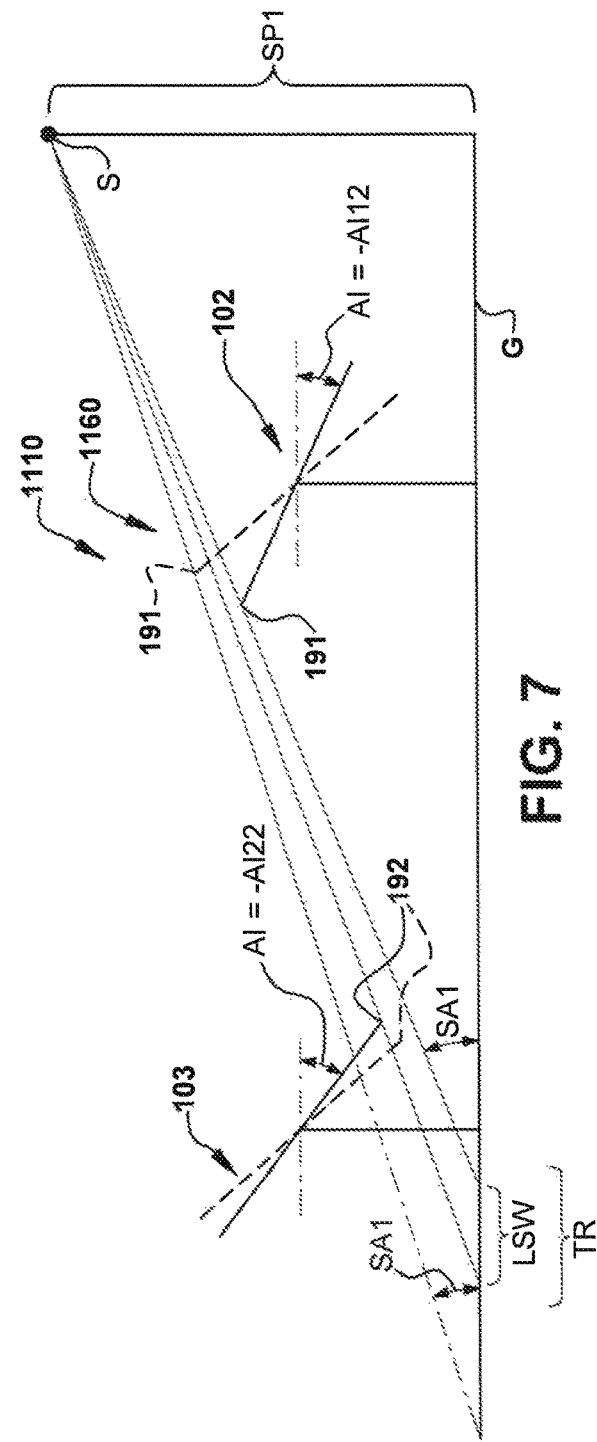
FIG. 7 is a schematic front elevation view of the adjacent first and second east most solar tracker assemblies of FIG. 6 wherein row-to-row shading of the plurality of photovoltaic modules of the table of the second solar tracker assembly by the plurality of photovoltaic modules of the table of the first solar tracker assembly is mitigated during a morning backtracking period by setting the respective angles of inclination of the tables of the first and second eastern most solar tracker assemblies in accordance with calculated angle of inclination value generated by a backtracking algorithm of the backtracking method of the present disclosure, for sun position SP1, the calculated angles of inclination resulting in the early morning sun's rays passing between facing edges of the plurality of photovoltaic modules of the table of the first solar tracker assembly and the plurality of photovoltaic modules of the table of the second solar tracker assembly such that a light stripe having width within a target range light stripe width would be cast upon the ground.

By comparison, FIG. 7 diagrammatically illustrates a situation wherein the backtracking method 1100 is utilized during the morning backtracking period BTM to mitigate the row-to-row shading problem illustrated in FIG. 6. In the backtracking mode 1120, the solar tracker controllers 602, 603 utilize the calculated table angle of inclination values CAI for the respective eastern most solar tracker assemblies 102, 103, which, in one exemplary or example embodiment, have been previously calculated by the array controller 510 and stored in the controller electronics 620 of the solar tracker controllers 602, 603. In the example of FIG. 7, during the morning backtracking period, BTM, when the sun's position is at SP1 and the sun angle is SA1, the calculated angle of inclination value CAI of the table 110 of the solar tracker assembly 102 is determined by the array controller 510 via the backtracking algorithm 1120 to be a table angle of inclination AI=AI12. The solar tracker controller 602 accordingly sets the table angle of inclination AI=AI12 for the solar tracker assembly 102. As can be seen in FIG. 7, the table angle of inclination AI12 is smaller or less steep than the angle of inclination AI=AI11 which would have used in the normal tracking mode 1200 at sun position SP1. Similarly, the calculated angle of inclination CAI of the table 110 of the solar tracker assembly 103 is determined via the backtracking algorithm 1120 to be table angle of inclination AI=AI22. The solar tracker controller 603 accordingly sets the table angle of inclination at the calculated angle of inclination for sun position SP1, i.e., AI=AI22. Again, the table angle of inclination AI=AI22 is smaller or less steep than the angle of inclination AI=AI21 which would have used in the normal tracking mode 1200 at sun position SP1. The reason that the calculated angle of inclination value CAI of AI22 changes to a smaller value as compared to AI21 for the solar tracker assembly 103 is that the backtracking algorithm 1120 is simultaneously taking into account the potential of the photovoltaic modules 190 of the solar tracker assembly 103 shading the photovoltaic modules 190 of the next row in the western direction, namely, the photovoltaic modules 190 of the solar tracker assembly 104. Although only two solar tracker assemblies 102, 103 are illustrated in FIG. 7, it should be understood that the backtracking algorithm 1120 seeks to mitigated row-to-row shading along the entirety of the first set of solar tracker assemblies 109a. Accordingly, in the morning backtracking period BTM wherein the backtracking mode 1110 is employed, the calculated table angle of inclination values CAI of potentially all of the solar tracker assemblies of the first set of solar tracker assemblies 109a may be changed or modified as compared to the normal tracking mode 1200 to mitigate row-to-row shading in a westerly direction by an early morning sun position. Similarly, in the evening backtracking period BTE wherein the backtracking mode 1110 is employed, the calculated table angle of inclination values CAI of potentially all of the solar tracker assemblies of the first set of solar tracker assemblies 109a may be changed or modified as compared to the normal tracking mode 1200 to mitigate row-to-row shading in an easterly direction by a late evening sun position. Thus, as noted above, in one example embodiment, the backtracking algorithm 1120 is an iterative, heuristic algorithm that utilizes algebra, geometry and/or trigonometry on the input value to iteratively determine the calculated table angle of inclination values CAI.

As schematically illustrated in FIG. 7, the calculated table angle of inclination values CAI, namely, the table angle of inclination AI12 of the table 110 of the first solar tracker assembly 102 and the table angle of inclination AI22 of the table 110 of the second solar tracker assembly 103 are calculated by the array controller 510 utilizing the backtracking algorithm 1120 and communicated to the solar tracker controllers 602, 603 such that, at sun position SP1 and sun angle SA1, sunlight passes between a facing edge 191 of the plurality of photovoltaic modules 192 of the table 110 of the first solar tracker assembly 102 and a facing edge 193 of the plurality of photovoltaic modules 190 of the table of the second solar tracker assembly 103 such that a light stripe having a light stripe width LSW within a target range light stripe width TR which would be cast on the ground G. The reason that the phrase "which would be cast on the ground G" is used above is that the backtracking algorithm 1120 uses input values input to the algorithm 1120 and calculates table angle of inclination values CAI for the tables 110 of each of the solar tracker assemblies of the first set of solar tracker assemblies 109a at various sun positions during the morning and evening backtracking periods BTM, BTE, such that, for each pair of adjacent solar tracker assemblies, e.g., solar tracker assemblies 102, 103, in a set of solar tracker assemblies, e.g., the set of parallel, aligned, spaced apart solar tracker assemblies 109a, a light stripe width LSW that is less than or equal to a target range light stripe width TR (schematically depicted in FIGS. 7 and 8), would be cast on the ground G. Thus, no measurements of actual light stripe width LSW are made, other than for the purpose of periodically check the validity/accuracy of the backtracking algorithm 1100 by measuring the light stripe width LSW of two random rows of solar tracker assemblies of the first set of solar tracker assemblies 109a. In one example embodiment, a width of the light stripe target range TR is between 40 mm. and 80 mm. The input values to the backtracking algorithm 1120 include: a) three dimensional coordinates of opposite ends 280, 282 of the torque tube beams 250 of each of the plurality of solar tracker assemblies 100 of the solar tracker installation 1000; b) edge distance values (distance between facing edges 191, 192 of photovoltaic modules of adjacent solar tracker assemblies in Y direction when the angle of inclination AI=0 degrees—neutral or horizontal position); c) sun position data; and d) table angle of inclination range AIR.

The backtracking method 1100, as implemented in the backtracking mode 1110 during the evening backtracking period BTE, is diagrammatically depicted in FIG. 8. Specifically, the backtracking method 1100 is utilized during the evening backtracking period BTE to mitigate the row-to-row shading problem in an easterly direction when the sun is positioned in the west, near sunset. In the backtracking mode 1110, the solar tracker controllers 608, 607 utilize the calculated table angle of inclination values CAI for the respective western most solar tracker assemblies 108, 107, which, in one exemplary or example embodiment, have been previously calculated by the array controller 510 and stored in the controller electronics 620 of the solar tracker controllers 602, 603. In the example of FIG. 8, during the evening backtracking period, BTE, when the sun's position is at SP2 and the sun angle is SA2, the calculated angle of inclination value CAI of the table 110 of the solar tracker assembly 108 is determined by the array controller 510 via the backtracking algorithm 1120 to be a table angle of inclination AI=AI32. The solar tracker controller 608 accordingly sets the table angle of inclination AI=AI32 for the solar tracker assembly 102. As can be seen in FIG. 7, the table angle of inclination AI32 is smaller or less steep than the angle of inclination AI=AI31 which would have used in the normal tracking mode 1200 at sun position SP2 (AI31 is shown in dashed line in FIG. 8). Similarly, the calculated angle of inclination value CAI of the table 110 of the solar tracker assembly 107 is determined via the backtracking algorithm 1120 to be table angle of inclination AI=AI42. The solar tracker controller 607 accordingly sets the table angle of inclination at the calculated angle of inclination for sun position SP2, i.e., AI=AI42. Again, the table angle of inclination AI=AI42 is smaller or less steep than the angle of inclination AI=AI41 which would have used in the normal tracking mode 1200 at sun position SP2 (AI41 is shown in dashed line in FIG. 8). The reason that the calculated angle of inclination value CAI of AI42 changes to a smaller value as compared to AI41 for the solar tracker assembly 107 is that the backtracking algorithm 1120 is simultaneously taking into account the potential of the photovoltaic modules 190 of the solar tracker assembly 107 shading the photovoltaic modules 190 of the next row in the eastern direction, namely, the photovoltaic modules 190 of the solar tracker assembly 106. Although only two solar tracker assemblies 108, 107 are illustrated in FIG. 8, it should be understood that the backtracking algorithm 1120 seeks to mitigated row-to-row shading along the entirety of the first set of solar tracker assemblies 109a. Accordingly, when the backtracking mode 1110 is employed in the evening backtracking period BTE, the calculated table angle of inclination values CAI of potentially all of the solar tracker assemblies of the first set of solar tracker assemblies 109a may be changed or modified as compared to the normal tracking mode 1200 to mitigate row-to-row shading in an easterly direction by a late evening sun position. Similarly, in the backtracking mode 1110, during the evening backtracking period BTE, the calculated table angle of inclination values CAI of potentially all of the solar tracker assemblies of the first set of solar tracker assemblies 109a may be changed or modified as compared to the normal tracking mode 1200 to mitigate row-to-row shading in an easterly direction by a late evening sun position.

FIG. 11 schematically illustrates the table angle of inclination AI over an approximate 48 hour time period for a given solar tracker assembly, for example, solar tracker assembly 103 of the set of aligned, parallel, spaced apart solar tracker assemblies 109a. During night hours, the associated solar tracker controller 603, utilizing the drive mechanism 150, operates in the night stow mode 1300 and positions the angle of inclination AI of the table 110 of the solar tracker assembly 103 at a night stow position NSP during a night stow period NS that commences at sunset time SS and ends at sunrise time SR. In one exemplary embodiment, the night stow position NSP corresponds to a table angle of inclination AI=−10 degrees (facing east at an angle of inclination of −10 degrees below horizontal or the neutral angle of inclination). At sunrise, the solar tracker controller 603, pivots the table 110 to the neutral or horizontal angle of inclination, AI=0 degrees. Subsequent to sunrise SR, the controller 603 switches to the backtracking mode or routine 1110. In the backtracking mode 1110, the controller 603 utilizes the calculated angle of inclination values CAI for the solar tracker assembly 102 and associated times or solar positions, as determined by the array controller 510 utilizing the backtracking algorithm 1120 and communicated by the array controller 510 to the solar tracker controller 603. The solar tracker controller 603, in turn, utilizes the calculated table angle of inclination values CAI to control the angle of inclination AI of the table 110 of the solar tracker assembly 103 during the morning backtracking period BTM such that the plurality of photovoltaic panels 190 of the solar tracker assembly 102 do not shade parts or all of the plurality of photovoltaic panels 190 of the next westerly adjacent solar tracker assembly 104. As can be seen in FIG. 11, as the sun rises during the morning backtracking period BTM, the controller 603 pivots the angle of inclination AI of the table 1100 from the neutral angle of inclination AI=0 degrees ultimately reaching the maximum negative angle of inclination AI− of the table (in this exemplary case, AI−=−60 degrees). Utilization of the backtracking mode 1110 by the controller 603 during the morning backtracking period BTM advantageously mitigates row-to-row shading of the plurality of photovoltaic modules of the next westerly adjacent solar tracker assembly 104 by the plurality of photovoltaic modules 190 of the solar tracker assembly 103 (row-to-row shading in the easterly direction). As can be seen in FIG. 2, an approximate length of the morning backtracking period BTM is two hours.

At such time as the morning backtracking mode 1110 ends with the table 110 at AI−, the solar tracker controller 603 switches to the normal tracking mode 1200 for the normal tracking period NT during daylight hours, wherein the table 110 is positioned such that the plurality of photovoltaic modules 190 of the solar tracker assembly 103 track the position of the sun S. The normal tracking mode 1200 continues and the table 110 reaches the maximum positive angle of inclination AI+(in this exemplary case, AI+=+60 degrees). At such time that row-to-row shading in the westerly direction would commence (i.e., row-to-row shading of the plurality of photovoltaic modules 190 of the next easterly adjacent solar tracker assembly 102 by the plurality of photovoltaic modules 190 of the solar tracker assembly 103, the solar tracker controller 603 changes from the normal tracking mode 1200 to the backtracking mode 1110 to commence the evening backtracking period BTE. Utilization of the calculated backtracking angle of inclination values CAI by the controller 603 during the evening backtracking period BTE advantageously mitigates row-to-row shading of the plurality of photovoltaic modules 190 of the next easterly adjacent solar tracker assembly 102 by the plurality of photovoltaic modules 190 of the solar tracker assembly 103 (row-to-row shading in the westerly direction).

For the set of solar tracker assemblies 109a, the morning backtracking period BTM commences at sunrise time SR and continues to such a time after sunrise where the sun's position in the eastern sky is sufficiently high above the eastern horizon wherein the normal tracking mode 1200 may be used without row to row shading occurring within the set of solar tracker assemblies 109a. Similarly, for a set of aligned, parallel, spaced apart solar tracker assemblies, for example, the set of solar tracker assemblies 109a, the evening backtracking period BTE commences when the sun's position in the western sky is sufficiently low above the western wherein the normal tracking mode 1200 would result in one or more instances of row to row shading within the set of solar tracker assemblies 109a occurring and the evening backtracking period BTE terminates as sunset. Thus, as is schematically depicted in FIG. 11, the normal tracking mode 1200 is in effect during daylight hours other than the morning and evening backtracking periods BTM, BTE. Those daylight hours where the normal tracking mode 1200 is in effect is referred to as a normal tracking period NT. During the nighttime hours, between the evening and morning backtracking periods BTM, BTE, the tables of the plurality of solar tracker assemblies 100 of the set of solar tracker assemblies 109a are stored in a night stow position 1300. This nighttime period wherein the solar tracker assemblies 100 of the set of solar tracker assemblies 109a are in the night stow position is referred to as the night stow period NSP.

As set forth in the simplified flow chart of FIG. 12, execution of the backtracking algorithm 1120 by the array controller 510 in connection with calculating table angles of inclination CAI for use during the backtracking period BT for two of the solar tracker assemblies of the first set of solar tracker assemblies 109a, namely, the first and second solar tracker assemblies 102, 103 of the first set of solar tracker assemblies 109a is depicted. It being understood, of course, that the backtracking algorithm would be executed by the array controller 510 to calculate table angles of inclination CAI during the backtracking periods BT of all of the solar tracker assemblies of both the first and second sets of solar tracker assemblies 109a, 109b of the solar tracker installation 1000. However, for ease of explanation, the discussion herein will focus on calculating table angles of inclination CAI for the first and second solar tracker assemblies 102, 103 of the first set of solar tracker assemblies 109a utilizing the backtracking algorithm 1120. In one example embodiment, the backtracking algorithm 1120, as executed or implemented by the array controller 510, may be viewed as including the following steps: a) at step 1130, data value inputs are provided to backtracking algorithm 1120; b) at step 1140, the array controller 510 executes the backtracking algorithm 1120 on the data value inputs, the backtracking algorithm 1120 performs calculations on the data value inputs; c) at step 1150, the outputs of the backtracking algorithm 1120 are generated and provided to the array controller 510; d) at step 1160, the array controller 520 communicates the backtracking algorithm outputs to the solar tracker controllers 602, 603 associated with the solar tracker controllers 102, 103; and e) at step 1170, the solar tracker controllers 602, 603 actuate the respective drive mechanisms 150 of the first and second solar tracker assemblies 102, 103 to set and periodically change the table angles of inclination AI in conformity with the calculated table angle of inclination positions CAI for the first and second solar tracker assemblies 102, 103 during morning and evening backtracking periods BTM, BTE.

At step 1130, the inputs to the backtracking algorithm 1120 include: a) three dimensional coordinates for ends of the torque tube beam of the first solar tracker assembly 102; b) three dimensional coordinates for ends of the torque tube beam of the second solar tracker assembly 103; c) horizontal distance between facing edges 191, 192 of the respective photovoltaic modules 190 of the first and second solar tracker assemblies 102, 103; d) sun position data from a sun position table appropriate for the geographical location of the solar tracker installation 1000; e) light strip width target range TR (e.g., a target range TR of 40-80 mm.); and e) an angle of inclination range AIR for each of the tables 110 of the first and second solar tracker assemblies 102, 103. At step 1140, the calculations performed by the backtracking algorithm 1120 include: a) calculate average horizontal distance between torque tube beams of the tables of the first and second solar tracker assemblies 102, 103; b) calculate average vertical differential between the torque tube beams of the tables of the first and second solar tracker assemblies 102, 103; and c) calculate table angle of inclination positions CAI for first and second solar tracker assemblies 102, 103 such that a width of a hypothetical light stripe LSW (schematically depicted in FIGS. 7 and 8) from sunlight passing between facing edge surfaces 191, 192 of the first set of photovoltaic modules 190 of the table 110 of the first solar tracker assembly 102 and the second set of photovoltaic modules 190 of the table 110 of the second solar tracker assembly 103 which would be projected onto the ground G is within the light stripe width target range TR (schematically depicted in FIGS. 7 and 8). At step 1150, the calculated values output to the array controller 510 from the calculations performed by the backtracking algorithm 1120 include: a) calculated angle of inclination values CAI of the table 110 of the first solar tracker assembly 102 and the associated times or sun position for each backtracking value CAI for each day of the expected life of the solar tracker controller 102; and b) calculated angle of inclination values CAI of table 110 of the second solar tracker assembly 103 and the associated times or sun position for each backtracking value CAI for each day of the expected life of the solar tracker controller 103.

During the backtracking period BT, that is, during the morning backtracking period BTM and the evening backtracking period BTE, the solar tracker controller 602 utilizes the stored, calculated table angle of inclination values CAI, along with the associated times or sun positions, and actuates the drive mechanism 150 of the solar tracker assembly 102 to set and periodically change the table angle of inclination AI of the solar tracker assembly 102 to comport with the calculated table angle of inclination values CAI for the corresponding times or sun positions of the backtracking period BT. Similarly, during the backtracking period BT, the solar tracker controller 603 utilizes the stored, calculated table angle of inclination values CAI, along with the associated times or sun positions, and actuates the drive mechanism 150 of the solar tracker assembly 103 to set and periodically change the table angle of inclination AI of the solar tracker assembly 103 to comport with the calculated table angle of inclination values CAI for the corresponding times or sun positions of the backtracking period BT.

Figure 13:
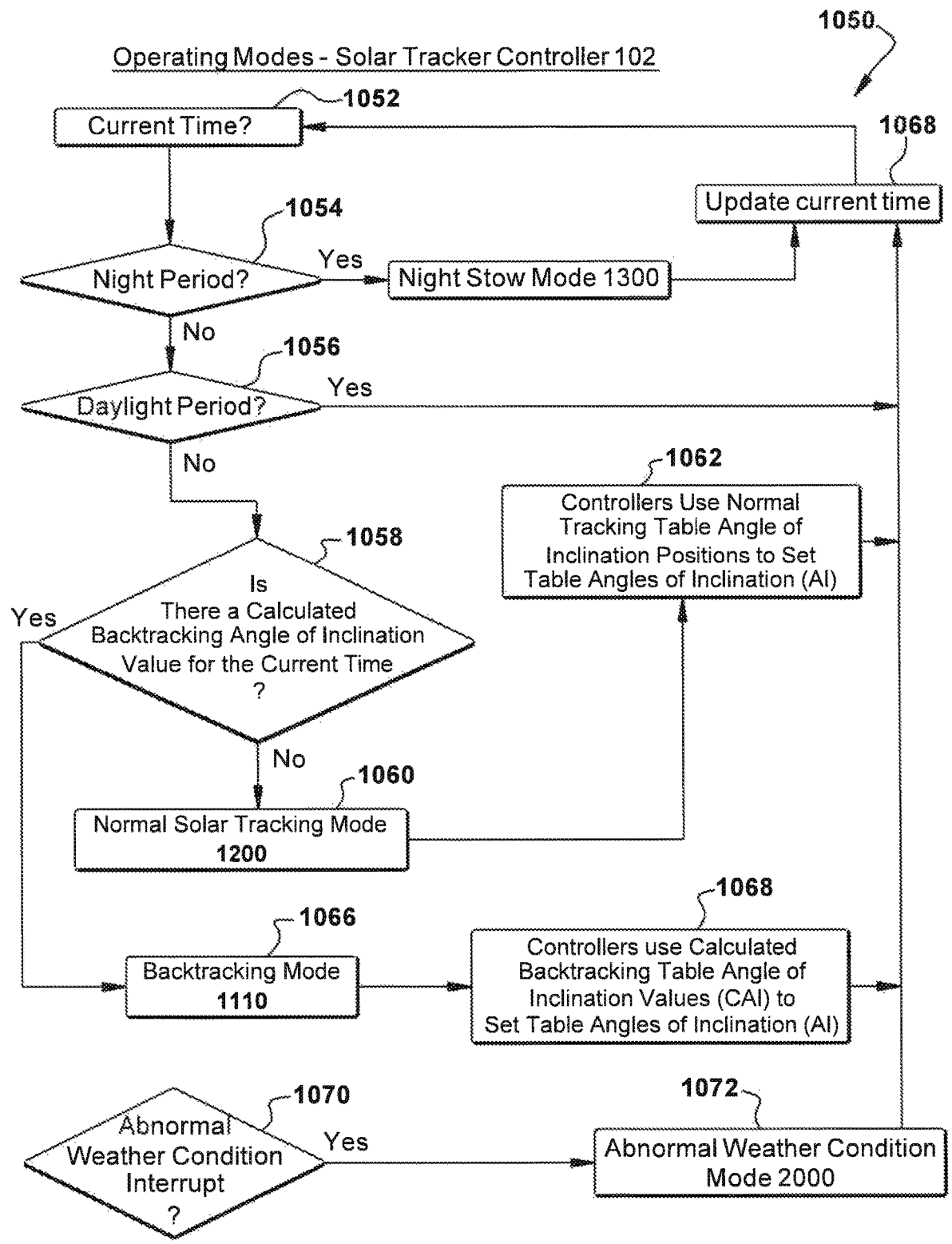
FIG. 13 is a simplified flow chart illustrating the process used by a solar tracker controller in determining which of the operating modes of a solar tracker assembly would be selected for use based on current time.

Select steps of the various operating modes of the solar tracker controller 102 are set forth in the simplified flow chart of FIG. 13. Turning to the simplified flow chart of FIG. 13, shown generally at 1162 is a simplified flow chart for the various operating modes, namely: a) the normal tracking mode 1200; b) the night stow mode 1300; c) the backtracking mode 1110, wherein calculated table angles of inclination CAI, as calculated by the backtracking algorithm 1120 are utilized by the solar tracker controllers of the first set of solar tracker controllers 609a to mitigate row-to-row shading during early morning and evening backtracking periods BTM, BTE which otherwise would occur if the normal sun tracking mode 1200 were utilized to set the table angles of inclination for the solar tracker assemblies of the first set of solar tracker assemblies 109a; and d) an abnormal weather condition mode 2000. The abnormal weather condition mode 2000 would be entered upon receiving an abnormal weather condition interrupt from the array controller 510 indicative of an unusual weather condition that requires corrective action to be taken by the solar tracker controller 602 to mitigate the effects of the unusual weather condition on the solar tracker assembly 102. Example of unusual weather conditions would include high wind conditions, overcast sky conditions, snow accumulation on the upper surfaces of the photovoltaic modules 190, etc.

At step 1052, the current time is examined. At step 1054, the solar tracker controller 602 determines if the current time is a night period by consulting sun position table. If at step 1054, the answer is yes, then the solar tracker controller 102 enters the night stow mode 1300 and sets the table 110 of the solar tracker assembly 102 is set to the night stow position NSP. At step 1054, the current time is not a night period, then it must be a daylight period. At step 1056, the current time is a daylight period, then at step 1058, the solar tracker controller 602 commences operation in the normal tracking mode 1200. At step 1058, if it is determined if there is a calculated backtracking table angle of inclination value CAI for the current time. If there is no calculated backtracking table angle of inclination value CAI for the current time, at step 1060, normal solar tracking mode 1200 is utilized by the solar tracker controller 602. At step 1062, the solar tracker controller 602 utilizes normal solar tracking table angles of inclination to set the angle of inclination position of the table 110 of the solar tracker assembly 102. If at step 1058, there is a calculated backtracking table angle of inclination value CAI for the current time, then at step 1066, the backtracking mode 1110 is utilized by the solar tracker controller 602. At step 1068, the solar tracker controller 602 utilizes the calculated backtracking table angle of inclination value to set the angle of inclination position of the table 110 of the solar tracker assembly 102. In all cases, the current time is periodically updated at step 1069 and the process 1050 is repeated. If, at any time, an abnormal weather condition interrupt is received by the solar tracker controller 102 from the array controller 510, for example, at step 1070, then at step 1072, the solar tracker controller 602, at step 1072, enters the abnormal weather condition mode 2000 and moves the angle of inclination AI of the table 110 of the solar tracker assembly 102 in accordance with one or more predetermined routines. When the array controller 510 communicates to the solar tracker controller 102 that the abnormal weather condition has terminated, the current time is updated at step 1069 and the process 1050 is repeated.

Method of Imaging 1400

Figure 10:
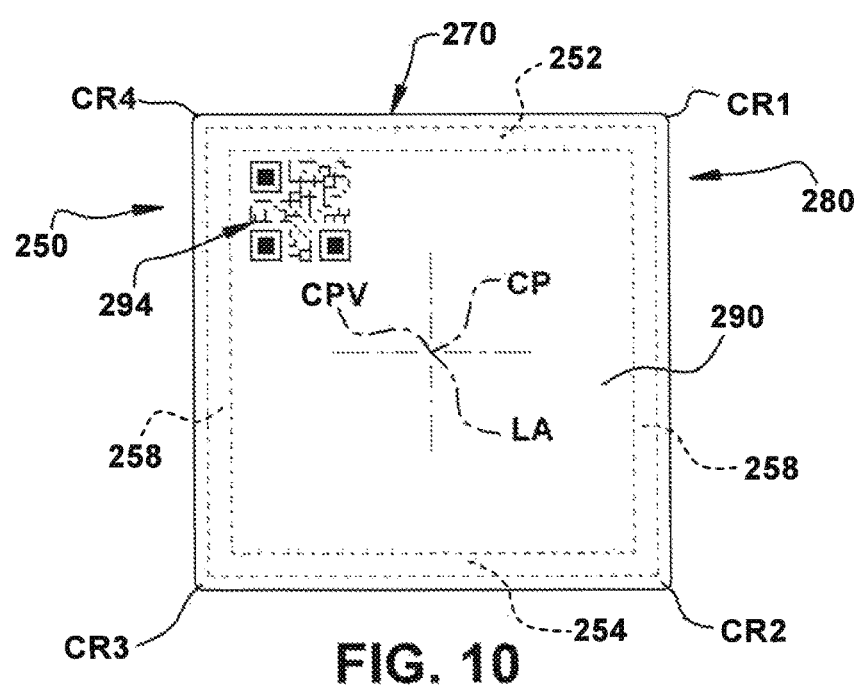
FIG. 10 is a schematic front elevation view of the end cap of FIG. 9, the end cap including a machine readable indicia.

Advantageously, the method of backtracking 1100 of the present disclosure also accounts for vertical differences in the heights of the respective plurality of photovoltaic modules of the first and second solar tracker assemblies 102, 104 when determining the angles of inclination AI of the respective tables 110 of the first and second solar tracker assemblies 102, 104 during the morning and evening backtracking periods BTM, BTE. The vertical height difference between the respective photovoltaic modules of the first and second solar tracker assemblies 102, 104 may be due to undulations of the land of an installation site 1002 on which the solar tracker installation 1000 is located. In one exemplary or example embodiment, as schematically depicted in FIGS. 1, 9 and 10, the opposite ends 280, 282 of the torque tube beam 250 include end caps 290, 292 (FIG. 1) which are imaged to provide accurate three dimensional coordinate values 280a, 282a for the beam ends 280, 282. The respective vertical dimensions of the torque tube beam ends 280, 282 permit an average vertical height of the solar tracker assembly 102 to be estimated. In one exemplary embodiment, the three dimensional coordinate values 280a, 282a for the beam ends 280, 282 of the respective torque tube beams 250 of the plurality of solar tracker assemblies 100 of the solar tracker installation 1000 are obtained via an imaging system 1450 of a drone DR. In FIGS. 1 and 9, a field of vision 1450a of the imaging system 1450 of the drone DR is schematically depicted in dashed line. One or more drones DR may be utilized, each drone having an imaging system 1450. Turning to FIGS. 9 and 10, the drone images the end caps 290, 292 overlying the beam ends 280, 282 of the torque tube beam 250 of the solar tracker assembly 102. In FIGS. 9 and 10, only the first end 280 of the torque tube beam 250 and its associate endcap 290 is shown. The first end 280 of the torque tube beam 250 is part of the torque tube beam segment 270 and is overlied by the end cap 290. The end cap 290 includes four corner points CR1, CR2, CR3, CR4 which are imaged, and the corresponding coordinate values are averaged to determine a center point CP of the end cap 290 and, specifically, three dimensional coordinates CPV of the center point CP of the end cap 290. The longitudinal axis LA of the torque tube beam 250 will pass through the calculated center point value CPV. The three dimensional coordinates CPV of the center point CP of the end cap 290 substantially correspond to the three dimensional coordinates of the end 280 of the torque tube beam 250 and is aligned with the longitudinal axis LA though the torque tube beam 250. The three dimensional coordinates of the opposite ends 280, 282 of the torque tube beam are then used to find the average three dimensional coordinates of the torque tube beam 250, including the average height or vertical coordinate of the torque tube beam 250. The average height or vertical coordinate of the torque tube beams 250 of each of the solar tracker assemblies of the first set of solar tracker assemblies 109a are input to the backtracking algorithm 1120 to advantageously allow for accounting for vertical or height differences in the solar tracker assemblies when calculating the table angle of inclination values CAI for the morning and evening backtracking periods BTM, BTE. In one exemplary embodiment, the end cap 290 includes a machine readable indicia 294, such as a matrix code, bar code, or QR code, which is imaged by the imaging system 1450 of the drone DR to allow for identification information concerning the solar tracker assembly identification number, the specific end of the torque tube being imaged, etc.

Two simplified flow charts illustrating selected steps of a method of imaging 1400 are set forth in FIG. 15 and FIG. 14. For simplicity, both flow charts reference the representative solar tracker assembly 102, it being understood that all of the other solar tracker assemblies of the solar tracker installation 1000 would be similarly imaged. Turning to FIG. 15, at step 1402, one or more selected elements 400 of the solar tracker assembly 102 are identified for which three dimensional coordinate values 410 are desired. At step 1404, imaging of the plurality of solar tracker assemblies 100 is undertaken. At step 1406, analysis of the images or image frames of the plurality of the solar tracker assemblies 100 is undertaken by the imaging software 1401. At step, 1408, for each solar tracker assembly, for example, solar tracker assembly 102, the imaging software 1401, utilizing the analyzed images, the one or more selected elements 400 of the solar tracker assembly 102 are identified. At step 1410, for each solar tracker assembly, for example, the solar tracker assembly 102, the imaging software 1401, determines three dimensional coordinate values 410 for each of the one or more selected elements 400 of the solar tracker assembly 102. At step 1412, the three dimensional coordinate values 410 for each of the one or more selected elements 400, or transformations thereof, are associated with the solar tracker assembly 102 and input to the backtracking algorithm software 1101. What is input to the backtracking algorithm 1120 may be the three dimensional coordinate values 410 associated with the corresponding solar tracker assembly 102 or it may be a transformation of the three dimensional coordinate values 410. For example, it could be an average of the two coordinate values 410 or if multiple coordinate values 410 are obtained, the transformation may be a linear regression or other function of the multiple coordinate values 410. Thus, the backtracking algorithm 1120 will either be receiving the "raw" three dimensional coordinate values 410 of some numerical transformation of the coordinate values 410.

The method of imaging 1400 set forth in the flow chart of FIG. 15 is more general, while the method of imaging 1420 set forth in the flow chart of FIG. 14 is a specific example embodiment of the method of imaging 1400 depicted by the flow chart of FIG. 15. The flow chart of the method of imaging 1420 depicted in FIG. 14, as stated above, is a more specific embodiment wherein it is assumed that the selected elements 400 are the two opposite end portions 280, 282 of the torque tube beam 250 of the table 110 and the ends of the torque tube beam 250 are overlied by first and second end caps 290, 292. At step 1422, utilizing one or more drones DR, the first and second end caps 290, 292 of the first and second ends 280, 282 of the torque tube beams 250 of each of the solar tracker assemblies of the plurality of solar tracker assemblies 100 of the solar tracker installation 1000 are imaged by the imaging system 1450 of the one or more drones DR. At step 1424, the image data is transferred or downloaded from the imaging system 1450 of the drone DR and the imaging program, routine, or algorithm 1401 is utilized to analyze the image data. Three dimensional coordinate values are determined for each of the four corner points CR1, CR2, CR3, CR4 of each end cap 290, 292. At step 1426, the imaging program 1401 determines for each end cap, an end cap center point coordinate value CPV by averaging the three dimensional coordinate values of the center caps 290, 292. At step 1428, the imaged data is analyzed for the presence of machine readable indicia 294. If such machine readable indicia 294 is found, then at step 1430, the machine readable indicia 294 is appropriately decoded, the decoded data providing identification data regarding the solar tracker assembly 102 and/or the corresponding solar tracker controller 602. At step 1432, the decoded solar tracker assembly/controller identification data is associated with the three dimensional coordinate values 280a, 282a for each of the end caps 290, 292. At step 1434, the decoded solar tracker assembly/controller identification data and the associated three dimensional coordinate values 280a, 282a for each of the end caps 290, 292 of each of the solar tracker assemblies of the first set 109a are input to the backtracking algorithm 1120. The backtracking algorithm 1120 utilizes the three dimensional coordinate value for the end caps as surrogates for the corresponding coordinate values of the torque tube beam ends 280, 292 and, in one exemplary embodiment, the coordinate values are used by the backtracking algorithm 1120 to find an average three dimensional value that characterizes a location of the associated solar tracker assembly, for example, a location of solar tracker assembly 102 on the installation site 1002, as to x, y and z (height) location values of the solar tracker controllers. The z (height) location values allow the backtracking algorithm 1120 to account for height differences among the solar tracker controllers of the set of solar tracker controllers 109a due to undulations in ground level over an extent of the set of solar tracker controllers 109a on the installation site thereby advantageously allowing the backtracking algorithm 1120 to account for height differential between solar tracker controllers when calculating table angles of inclination for the backtracking period BT for each of the solar tracker assemblies of the first set of solar tracker assemblies 109a.

It should be understood, of course, that there are a number of variations/alternatives possible regarding the method of imaging 1400, as would be appreciated by one of skill in the art. Each of these variations/alternative should be understood to be part of the present disclosure and within the scope of the present disclosure, including its claims. Generally, the method of imaging 1400 images one or more features of each solar tracker assembly, say solar tracker assembly 102 of the first set of solar tracker assemblies 109a of the plurality of solar tracker assemblies 100 of the solar tracker installation 1000, to obtain one or more three dimensional coordinate values that characterize a location of the solar tracker assembly 102 for purposes of providing the backtracking algorithm 1120 with accurate three dimension or three dimensional coordinate values or three dimension or three dimensional location values, including height location values, of the solar tracker assemblies. One variation of the method of imaging 1400 is described above, that is, for each solar tracker assembly, say solar tracker assembly 102, of the plurality of solar tracker assemblies 100 of the solar tracker installation 1002, the imaging method 1400 includes imaging two selected elements or features of the solar tracker assembly 102, the two elements/features being the first and second end caps 290, 292 of the first and second ends 280, 282 of the torque tube beam 250 of the solar tracker assembly 102. The three dimensional coordinate values 280a, 282a of the endcaps 290, 292 are representative of the location of the two ends 280, 282 of the torque tube beam 250 of the solar tracker assembly 102. These three dimensional coordinates 280a, 282a may be used directly by the backtracking algorithm 1120 or they may be transformed by either the imaging software 1401 or the backtracking software 1101. For example, the imaging software 1401 or the backtracking software 1101 may take an average of the two coordinates to find an average three dimensional coordinate value for the solar tracker assembly 102. This average three dimensional location value for the solar tracker assembly 102 would be utilized by the backtracking algorithm 1120 when computing appropriate table angles of inclination for the backtracking period BT for each solar tracker assembly in the set of adjacent solar tracker assemblies 109a.

Another variation/alternative of the method of imaging 1400 would involve imaging/identifying a single element or feature of each solar tracker assembly (as opposed to opposite ends 280, 282 of the torque tube beam 250), for example, imaging/identifying the drive mechanism 150 driving the torque tube beam 250 of the solar tracker assembly 102 or imaging/identifying an easternmost (or westernmost) photovoltaic module of the plurality of photovoltaic modules 190 of the solar tracker assembly 102. The drive mechanism 150 of the solar tracker assembly 102 includes the DC motor 180 and associated slew drive housing 162 which houses the gear train of the slew drive 160. The rationale here would be that the drive mechanism 150 is typically positioned near a midpoint of the torque tube beam 250 of the solar tracker assembly 102, thus, the associated three dimensional coordinate value of the drive mechanism 150 would be a reasonable approximation of the location (including height) of the solar tracker assembly 102. Another variation/alternative of the method of imaging 1400 would involve imaging/identifying a single element, for example, an easternmost (or a westernmost) photovoltaic module of the plurality of photovoltaic modules 190 of the solar tracker assembly 102. Another alternative would be to image and identify both an easternmost and a westernmost photovoltaic module of the plurality of photovoltaic modules 190 of the solar tracker assembly 102.

Yet another variation/alternative of the method of imaging 1400 would be to image three or more elements/features of each solar tracker assembly 102 to thereby increase the number of three dimensional coordinate data points or values associated with the solar tracker assembly 102. Thus, the number of data points input available to the backtracking algorithm 1120 thereby allowing the backtracking algorithm to more accurately account for height difference between various portions or segments of the solar tracker assembly 102. This multi data point approach would be helpful where there are ground level undulations over a north-south extent of the solar tracker assembly 102. By way of example, the elements to be imaged may include the two end caps 290, 292 and the drive mechanism 150, thereby imaged features and associated three dimensional coordinate values would be obtained for both end portions 280, 282 of the torque tube beam 250, as well as at or near the midpoint of the torque tube beam 250. Another multi data point method of imaging 1400 would be to image the solar tracker assembly 102 in predetermined increments, for example, imaging one end portion 280 by imaging end cap 290 of the torque tube beam 250, and also imaging the torque tube beam in 50 foot intervals from the respective end portion 280 (or, more specifically, imaging a corresponding photovoltaic module overlying the torque tube beam 250 in 50 foot intervals). As can be seen in FIGS. 1-4, the plurality of photovoltaic modules 190 overlie the torque tube beam 250 over a large portion of a total extent of the torque tube beam 250). Thus, for a 400 foot torque tube beam, there would be nine elements 400 of the solar tracker assembly 102 imaged and nine corresponding three dimensional coordinate values determined by the imaging software 1140, as follows: end portion 280, +50 feet from end portion 280, +100 feet, +150 feet, +200 feet, +250 feet, +300 feet, +350 feet, and +400 feet.

It is also within the contemplation of the present disclosure that the method of imaging 1400, that is, the imaging of elements 400 of the solar tracker assemblies 100, may be accomplished by a variety or combination of systems and technologies, as would be understood by those of skill in the art. That is, it should be understood that including and/or in addition to an imaging system including the one or more drones DR and associated drone imaging systems 1450 as discussed above, the present disclosure also contemplates and includes, for example and without limitation, satellite imaging systems, ground based imaging systems, such as imaging with cameras, smart phones, etc., hand-held or mounted on vehicles, autonomous or human-controlled, etc., as well as anal imaging systems utilizing planes, balloons, etc. Additionally, it should be understood that the imaging technology utilizing by the imaging system(s) could any one or a combination of imaging technologies, including LiDAR and optical imaging.

As used herein, terms of orientation and/or direction such as upward, downward, forward, rearward, upper, lower, inward, outward, inwardly, outwardly, horizontal, horizontally, vertical, vertically, distal, proximal, axially, radially, etc., are provided for convenience purposes and relate generally to the orientation shown in the Figures and/or discussed in the Detailed Description. Such orientation/direction terms are not intended to limit the scope of the present disclosure, this application and the invention or inventions described therein, or the claims appended hereto.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A method of backtracking utilizing a backtracking algorithm to calculate angle of inclination positions for a first table of a first solar tracker assembly and angle of inclination positions for a second table of a second solar tracker assembly, the first and second solar tracker assemblies being adjacent row solar tracker assemblies within a solar tracker installation, to mitigate shading of a first set of photovoltaic modules of the first table of the first solar tracker assembly by a second set of photovoltaic modules of the second table of the second solar tracker assembly, the steps of the method comprising:
   a) imaging at least one selected element of the first solar tracker assembly and utilizing images of the at least one selected element to determine three dimensional coordinates associated with the first solar tracker assembly;
   b) imaging at least one selected element of the second solar tracker assembly and utilizing images of the at least one selected element to determine three dimensional coordinates associated with the second solar tracker assembly;
   c) inputting to the backtracking algorithm: 1) the three dimensional coordinates associated with the first solar tracker assembly; 2) the three dimensional coordinates associated with the second solar tracker assembly; 3) a chord value for the first set of photovoltaic modules of the first table of the first solar tracker assembly and a chord value for the second set of photovoltaic modules of the second table of the second solar tracker assembly; 4) an angle of inclination range for the first table and an angle of inclination range for the second table; and 5) sun position data;
   d) the backtracking algorithm calculating first angle of inclination values for the first table of the first solar tracker assembly and calculating second angle of inclination values for the second table of the second solar tracker assembly; and
   e) pivoting first table of the first solar tracker assembly in accordance with the first angle of inclination values and pivoting the second table of the second solar tracker assembly in accordance with the second angle of inclination values.

2. The method of claim 1 wherein the step of part (a) of determining the three dimensional coordinates associated with the first solar tracker assembly includes the substep of determining three dimensional coordinates of first and second ends of the torque tube beam of the first table of the first solar tracker assembly and wherein the step of part (b) of determining the three dimensional coordinates associated with the second solar tracker assembly includes the substep of determining three dimensional coordinates of first and second ends of the torque tube beam of the second table of the second solar tracker assembly.

3. The method of claim 2 wherein a numerical average of the three dimensional coordinates of the first and second ends of the torque tube beam of the first table of the first solar tracker assembly is the three dimensional coordinates associated with the first solar tracker assembly and a numerical average of the three dimensional coordinates of the first and second ends of the torque tube beam of the second table of the second solar tracker assembly is the three dimensional coordinates associated with the second solar tracker assembly.

4. The method of claim 1 wherein a drone images the at least one selected element of the first solar tracker assembly and images the at least one selected element of the second solar second solar tracker assembly.

5. The method of claim 1 wherein the step of part (d) includes the substep of the backtracking algorithm determining a horizontal distance between facing edge surfaces of the first set of photovoltaic modules of the first table of the first solar tracker assembly and the second set of photovoltaic modules of the second table of the second solar tracker assembly when the first and second set of photovoltaic modules are in a horizontal position.

6. The method of claim 1 wherein the step of part (d) includes of the substep of the backtracking algorithm calculating first angle of inclination values for the first table of the first solar tracker assembly and calculating second angle of inclination values for the second table of the second solar tracker assembly such that a width of a light stripe from sunlight passing between facing edge surfaces of the first set of photovoltaic modules of the first table of the first solar tracker assembly and the second set of photovoltaic modules of the second table of the second solar tracker assembly and projected onto ground would be within a light stripe width target range.

7. The method of claim 1 wherein a duration of time during which the first table of the first solar tracker assembly is pivoted in accordance with the first angle of inclination values and the second table of the second solar tracker assembly is pivoted in accordance with the second angle of inclination values is referred to as a backtracking period and the backtracking period includes a morning backtracking period and an evening backtracking period.

8. The method of claim 2 wherein the step of part (e) of claim 1 includes of the substep of the backtracking algorithm calculating an average vertical distance between the respective torque tube beams of the first and second tables of the first and second tracker assemblies utilizing the coordinates of the first and second ends of the torque tube beam of the first table of the first solar tracker assembly and the coordinates of the first and second ends of the torque tube beam of the second table of the second solar tracker assembly.

9. The method of claim 2 wherein the step of part (a) of determining the three dimensional coordinates of the first and second ends of the torque tube beam of the first table of the first solar tracker assembly includes the substep of determining three dimensional coordinates of first and second end caps affixed to the first and second ends of the torque tube beam of the first table of the first solar tracker assembly and wherein the step of part (b) of determining the three dimensional coordinates of the first and second ends of the torque tube beam of the second table of the second solar tracker assembly includes the substep of determining three dimensional coordinates of first and second end caps affixed to the first and second ends of the torque tube beam of the second table of the second solar tracker assembly.

10. The method of claim 9 wherein the first and second end caps attached to the torque tube beam of the first table of the first solar tracker assembly include machine readable indicia identifying the first solar tracker assembly and the first and second end caps attached to the torque tube beam of the second table of the second solar tracker assembly include machine readable indicia identifying the second solar tracker assembly.

11. A method of backtracking utilizing a backtracking algorithm to calculate angle of inclination positions for a first table of a first solar tracker assembly and angle of inclination positions for a second table of a second solar tracker, the first and second solar tracker assemblies being adjacent row solar tracker assemblies within a solar tracker installation, the first table of the first solar tracker assembly including a first set of photovoltaic modules and the second table of the second solar tracker assembly including a second set of photovoltaic modules, the steps of the method comprising:

a) imaging at least one selected element of the first solar tracker assembly and utilizing images of the at least one selected element to determine three dimensional coordinates associated with the first solar tracker assembly;

b) imaging at least one selected element of the second solar tracker assembly and utilizing images of the at least one selected element to determine three dimensional coordinates associated with the second solar tracker assembly;

c) inputting to the backtracking algorithm: 1) the three dimensional coordinates associated with the first solar tracker assembly; 2) the three dimensional coordinates associated with the second solar tracker assembly; 3) a chord value for the first set of photovoltaic modules of the first table of the first solar tracker assembly and a chord value for the second set of photovoltaic modules of the second table of the second solar tracker assembly; and 4) sun position data;

d) the backtracking algorithm calculating first angle of inclination values for the first table of the first solar tracker assembly and calculating second angle of inclination values for the second table of the second solar tracker assembly; and e) pivoting first table of the first solar tracker assembly in accordance with the first angle of inclination values and pivoting the second table of the second solar tracker assembly in accordance with the second angle of inclination values.

12. The method of claim 11 wherein, in part (c), an angle of inclination range for the first table and an angle of inclination range for the second table are input to the backtracking algorithm.

13. The method of claim 11 wherein the step of part (a) of determining the three dimensional coordinates associated with the first solar tracker assembly includes the substep of determining three dimensional coordinates of first and second ends of the torque tube beam of the first table of the first solar tracker assembly and wherein the step of part (b) of determining the three dimensional coordinates associated with the second solar tracker assembly includes the substep of determining three dimensional coordinates of first and second ends of the torque tube beam of the second table of the second solar tracker assembly and further wherein a numerical average of the three dimensional coordinates of the first and second ends of the torque tube beam of the first table of the first solar tracker assembly is the three dimensional coordinates associated with the first solar tracker assembly and a numerical average of the three dimensional coordinates of the first and second ends of the torque tube beam of the second table of the second solar tracker assembly is the three dimensional coordinates associated with the second solar tracker assembly.

14. The method of claim 11 wherein a drone images the at least one selected element of the first solar tracker assembly and images the at least one selected element of the second solar second solar tracker assembly.

15. The method of claim 11 wherein the step of part (d) includes the substep of the backtracking algorithm determining a horizontal distance between facing edge surfaces of the first set of photovoltaic modules of the first table of the first solar tracker assembly and the second set of photovoltaic modules of the second table of the second solar tracker assembly when the first and second set of photovoltaic modules are in a horizontal position.

16. The method of claim 13 wherein the step of part (e) includes of the substep of the backtracking algorithm calculating an average vertical distance between the respective torque tube beams of the first and second tables of the first and second tracker assemblies utilizing the coordinates of the first and second ends of the torque tube beam of the first table of the first solar tracker assembly and the coordinates of the first and second ends of the torque tube beam of the second table of the second solar tracker assembly.

17. The method of claim 13 wherein the step of part (a) of determining the three dimensional coordinates of the first and second ends of the torque tube beam of the first table of the first solar tracker assembly includes the substep of determining three dimensional coordinates of first and second end caps affixed to the first and second ends of the torque tube beam of the first table of the first solar tracker assembly and wherein the step of part (b) of determining the three dimensional coordinates of the first and second ends of the torque tube beam of the second table of the second solar tracker assembly includes the substep of determining three dimensional coordinates of first and second end caps affixed to the first and second ends of the torque tube beam of the second table of the second solar tracker assembly and further wherein the first and second end caps attached to the torque tube beam of the first table of the first solar tracker assembly include machine readable indicia identifying the first solar tracker assembly and the first and second end caps attached to the torque tube beam of the second table of the second solar tracker assembly include machine readable indicia identifying the second solar tracker assembly.

18. A method of backtracking utilizing a backtracking algorithm to calculate angle of inclination positions for a first table of a first solar tracker assembly and angle of inclination positions for a second table of a second solar tracker, the first and second solar tracker assemblies being adjacent row solar tracker assemblies within a solar tracker installation, the first table of the first solar tracker assembly including a first set of photovoltaic modules and the second table of the second solar tracker assembly including a second set of photovoltaic modules, the steps of the method comprising:
a) imaging at least one element of the first solar tracker assembly and utilizing the imaging to determine coordinates associated with the first solar tracker assembly;
b) imaging at least one element of the second solar tracker assembly and utilizing the imaging to determine coordinates associated with the second solar tracker assembly;
c) inputting to the backtracking algorithm: 1) the coordinates associated with the first solar tracker assembly; 2) the coordinates associated with the second solar tracker assembly; 3) a chord value for the first set of photovoltaic modules of the first table of the first solar tracker assembly and a chord value for the second set of photovoltaic modules of the second table of the second solar tracker assembly; and 4) sun position data;
d) the backtracking algorithm calculating first angle of inclination values for the first table of the first solar tracker assembly and calculating second angle of inclination values for the second table of the second solar tracker assembly; and
c) pivoting first table of the first solar tracker assembly in accordance with the first angle of inclination values and pivoting the second table of the second solar tracker assembly in accordance with the second angle of inclination values.

19. The method of claim 18 wherein, in part (a), the coordinates associated with the first solar tracker assembly are three dimensional coordinates and, in part (b), the coordinates associated with the second solar tracker assembly are three dimensional coordinates.

20. The method of claim 18 wherein, in part (c), an angle of inclination range for the first table and an angle of inclination range for the second table are input to the backtracking algorithm.

21. The method of claim 19 wherein the step of part (a) of determining the three dimensional coordinates associated with the first solar tracker assembly includes the substep of determining three dimensional coordinates of first and second ends of the torque tube beam of the first table of the first solar tracker assembly and wherein the step of part (b) of determining the three dimensional coordinates associated with the second solar tracker assembly includes the substep of determining three dimensional coordinates of first and second ends of the torque tube beam of the second table of the second solar tracker assembly.

22. The method of claim 21 wherein a numerical average of the three dimensional coordinates of the first and second ends of the torque tube beam of the first table of the first solar tracker assembly is the three dimensional coordinates associated with the first solar tracker assembly and a numerical average of the three dimensional coordinates of the first and second ends of the torque tube beam of the second table of the second solar tracker assembly is the three dimensional coordinates associated with the second solar tracker assembly.

23. The method of claim 18 wherein a drone images the at least one element of the first solar tracker assembly and images the at least one element of the second solar second solar tracker assembly.

24. The method of claim 18 wherein the step of part (d) includes the substep of the backtracking algorithm determining a horizontal distance between facing edge surfaces of the first set of photovoltaic modules of the first table of the first solar tracker assembly and the second set of photovoltaic modules of the second table of the second solar tracker assembly when the first and second set of photovoltaic modules are in a horizontal position.

25. The method of claim 21 wherein the step of part (e) includes of the substep of the backtracking algorithm calculating an average vertical distance between the respective torque tube beams of the first and second tables of the first and second tracker assemblies utilizing the coordinates of the first and second ends of the torque tube beam of the first table of the first solar tracker assembly and the coordinates of the first and second ends of the torque tube beam of the second table of the second solar tracker assembly.

26. The method of claim 21 wherein the step of part (a) of determining the three dimensional coordinates of the first and second ends of the torque tube beam of the first table of the first solar tracker assembly includes the substep of determining three dimensional coordinates of first and second end caps affixed to the first and second ends of the torque tube beam of the first table of the first solar tracker assembly and wherein the step of part (b) of determining the three dimensional coordinates of the first and second ends of the torque tube beam of the second table of the second solar tracker assembly includes the substep of determining three dimensional coordinates of first and second end caps affixed to the first and second ends of the torque tube beam of the second table of the second solar tracker assembly.

27. The method of claim 26 wherein the first and second end caps attached to the torque tube beam of the first table of the first solar tracker assembly include machine readable indicia identifying the first solar tracker assembly and the first and second end caps attached to the torque tube beam of the second table of the second solar tracker assembly include machine readable indicia identifying the second solar tracker assembly.

* * * * *